United States Patent [19]

Horowitz

[11] Patent Number: 4,802,230
[45] Date of Patent: Jan. 31, 1989

[54] METHOD AND APPARATUS FOR GENERATING SIZE AND ORIENTATION INVARIANT SHAPE FEATURES

[75] Inventor: Steven L. Horowitz, Piedmont, Calif.

[73] Assignee: GTX Corporation, Phoenix, Ariz.

[21] Appl. No.: 26,672

[22] Filed: Mar. 13, 1987

[51] Int. Cl.⁴ .............................................. G06K 9/46
[52] U.S. Cl. .......................................... 382/22; 382/37
[58] Field of Search ........................ 382/22, 37, 28, 57

[56] References Cited

U.S. PATENT DOCUMENTS

| | | | |
|---|---|---|---|
| 3,925,760 | 12/1975 | Mason et al. | 382/57 |
| 4,007,440 | 2/1977 | Kono et al. | 382/28 |
| 4,097,847 | 6/1978 | Forsen et al. | 382/22 |
| 4,105,998 | 8/1978 | Yoshida et al. | 382/22 |

OTHER PUBLICATIONS

"On the Encoding Arbitrary Geometric Configurations", H. Freeman, IRE Transactions Electronic Computing, vol. EC-10, Jun. 1961, pp. 260-268.

"Description and Discrimination of Planar Shapes Using Shape Matrices", A. Goshtasby, IEEE Transactions on Pattern Analysis and Machine Intelligence, vol. PAMI-7, No. 6, Nov. 1985, pp. 738-743.

"Visual Pattern Recognition by Moment Invariants", M. K. Hu, IRE Transactions Information Theory, vol. IT-8, Feb. 1962, pp. 179-187.

"Algorithms for Shape Analysis of Contours and Waveforms", T. Pavlidis, IEEE Transactions on Pattern Analysis and Machine Intelligence, vol. PAMI-2, No. 4, Jul. 1980, pp. 301-312.

"Fourier Descriptors for Plane Closed Curves", C. T. Zahn et al., IEEE Transactions Computers, vol. C-21, Feb. 1972, pp. 269-281.

Primary Examiner—Leo H. Boudreau
Attorney, Agent, or Firm—Cahill, Sutton & Thomas

[57] ABSTRACT

A system extracts a set of size invariant, rotation invariant features from pixel data of a character and sends the set of features to a statistical decision tree to effectuate automatic recognition of a character. The set of extracted features includes a first group obtained by generating arrays representable as dimensions and other geometric qualities of six minimum bounding rectangles rotated about the character, including the distances between the center points of the rotated bounding rectangles. A second group of features is extracted by generating a group of arrays representing the perimeter pixel locations, radii lengths, and direction codes. The arrays of that group are "resampled" to generate corresponding 64 point arrays. The resampled array of direction codes is smoothed and incremental direction codes are computed and compared to preselected thresholds to obtain features that indicate prominent convex and concave portions of the character. A third group of features is extracted by dividing a circle bounding the character into eight rings and 24 slices and counting the number of character pixels contained in each ring and in each slice. Various Fourier transforms, autocorrelations, moment calculations, and sorting operations are performed on many of the aforementioned arrays to yield further size and orientation invariant features. The distance between the centroid of the largest hole of the character and the center of the character is computed. The ratios of the perimeters of first and second holes of the character to the outer perimeter are computed.

21 Claims, 18 Drawing Sheets

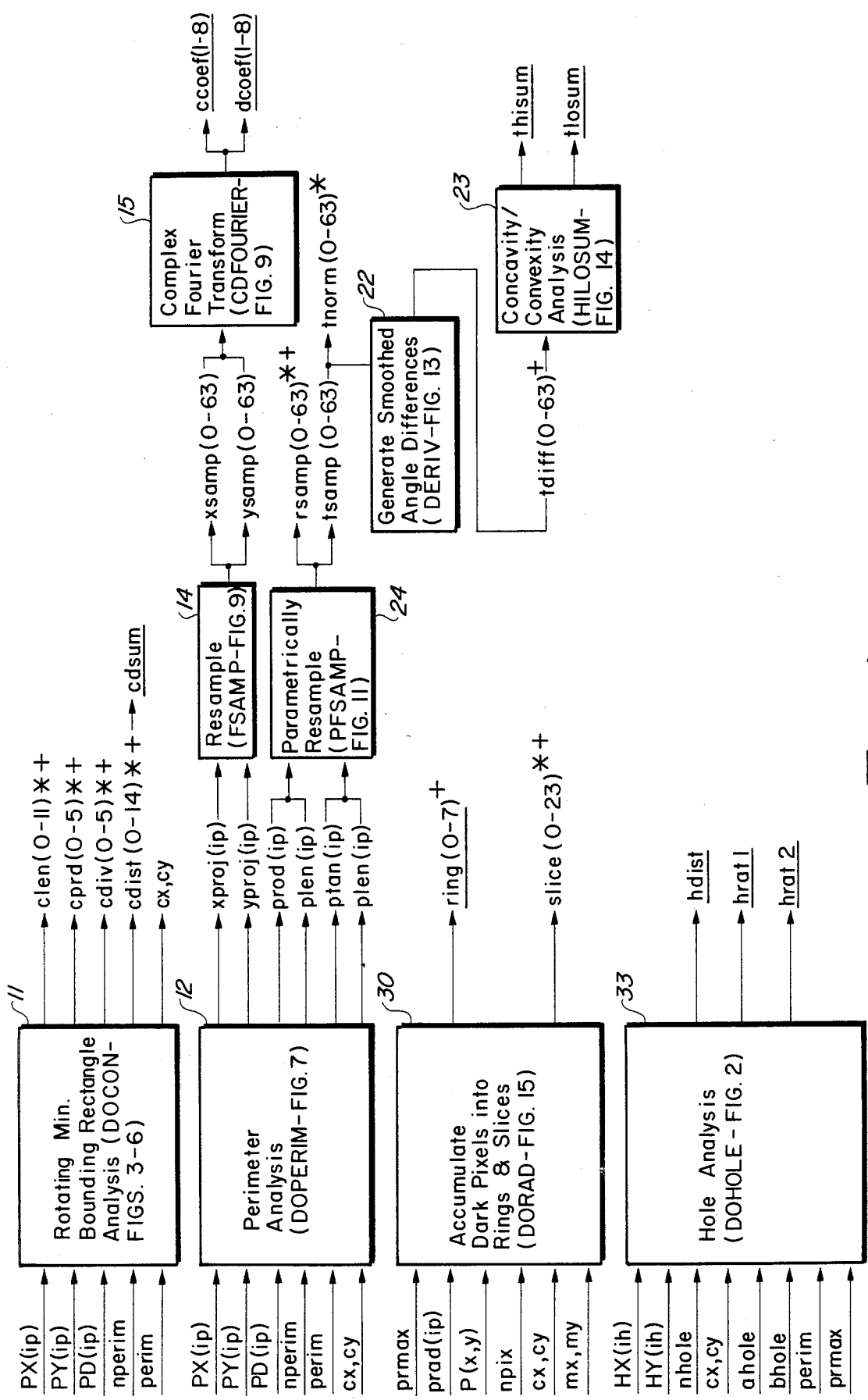

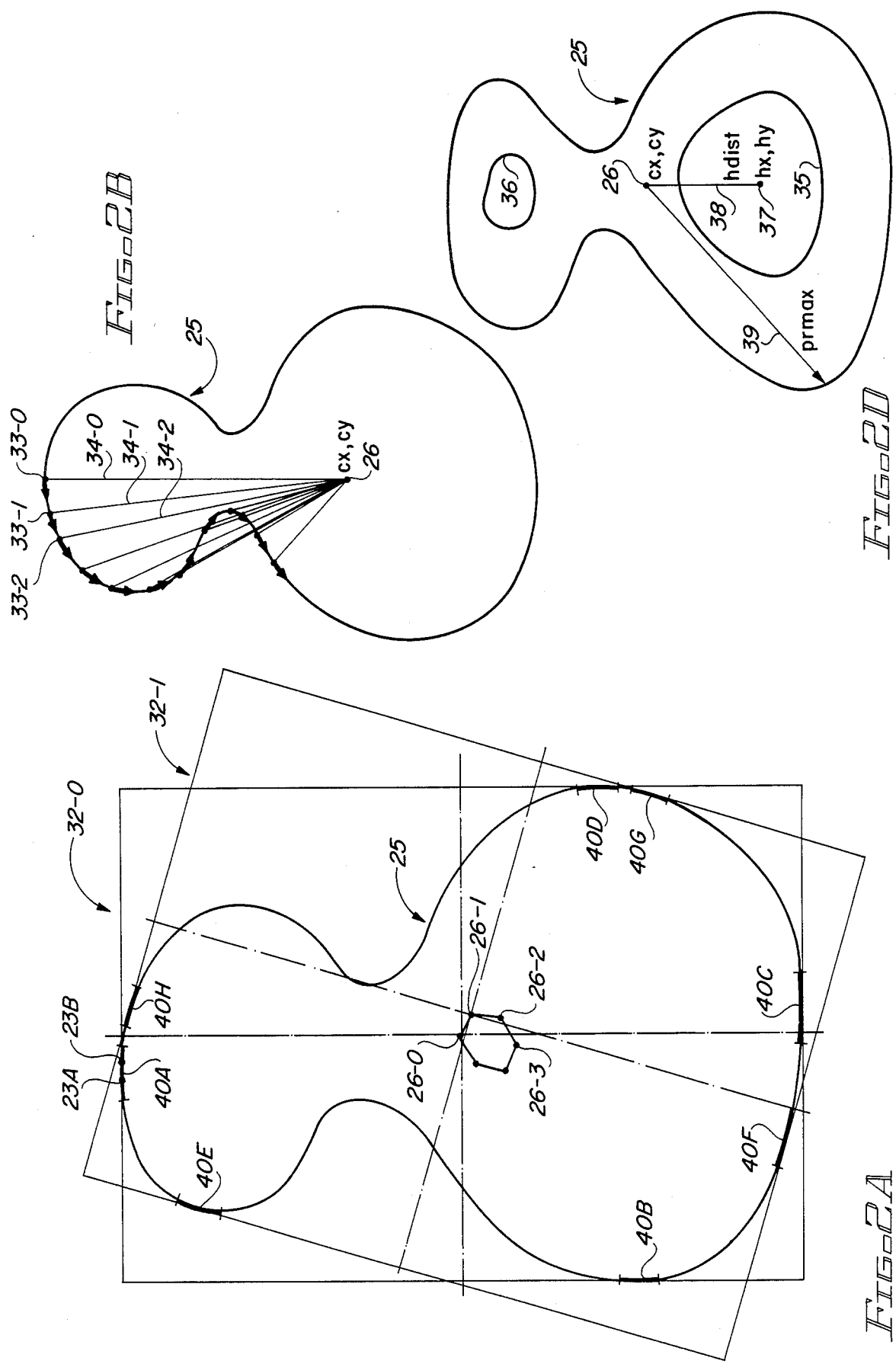

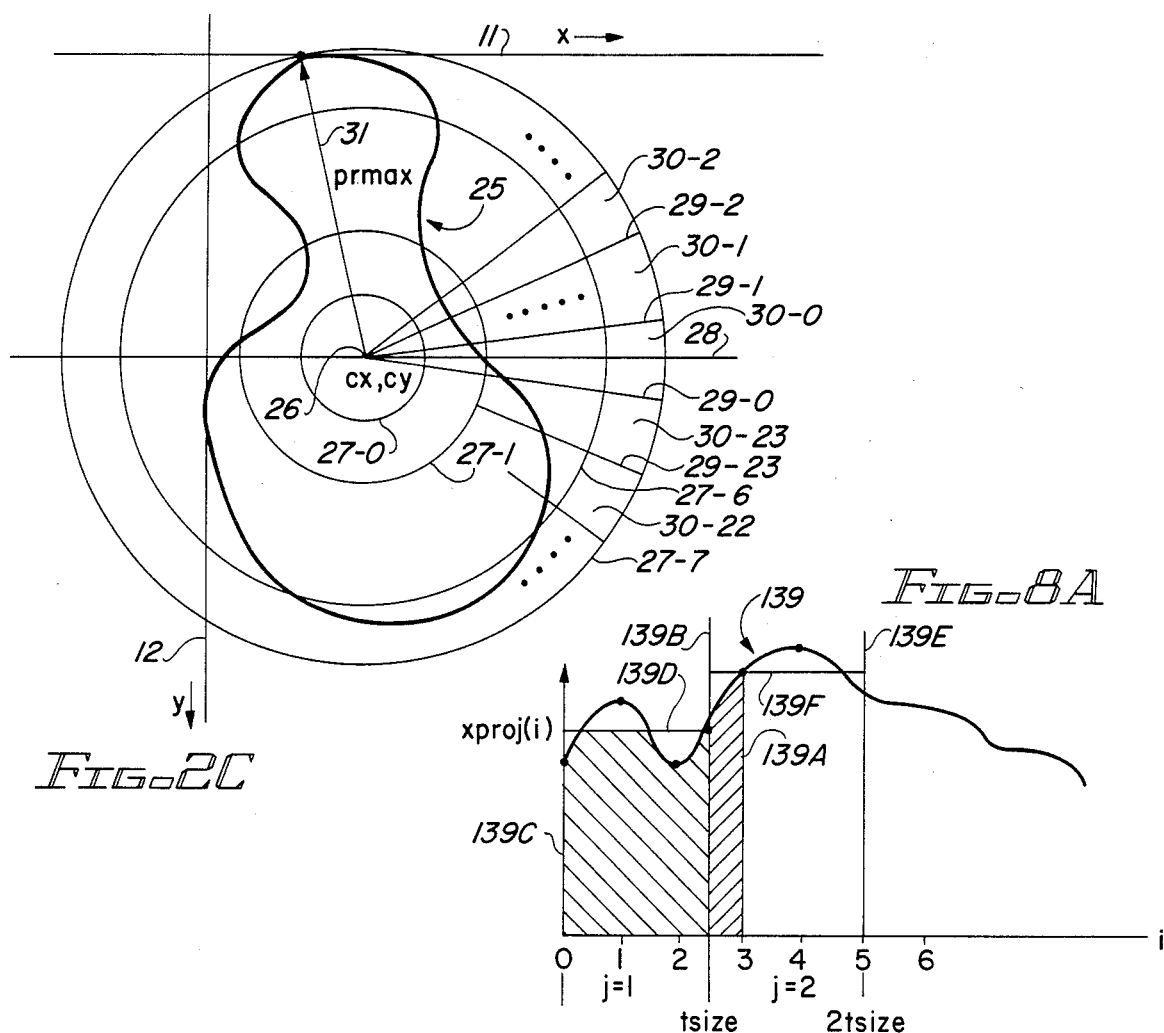
FIG.-2C
FIG.-8A
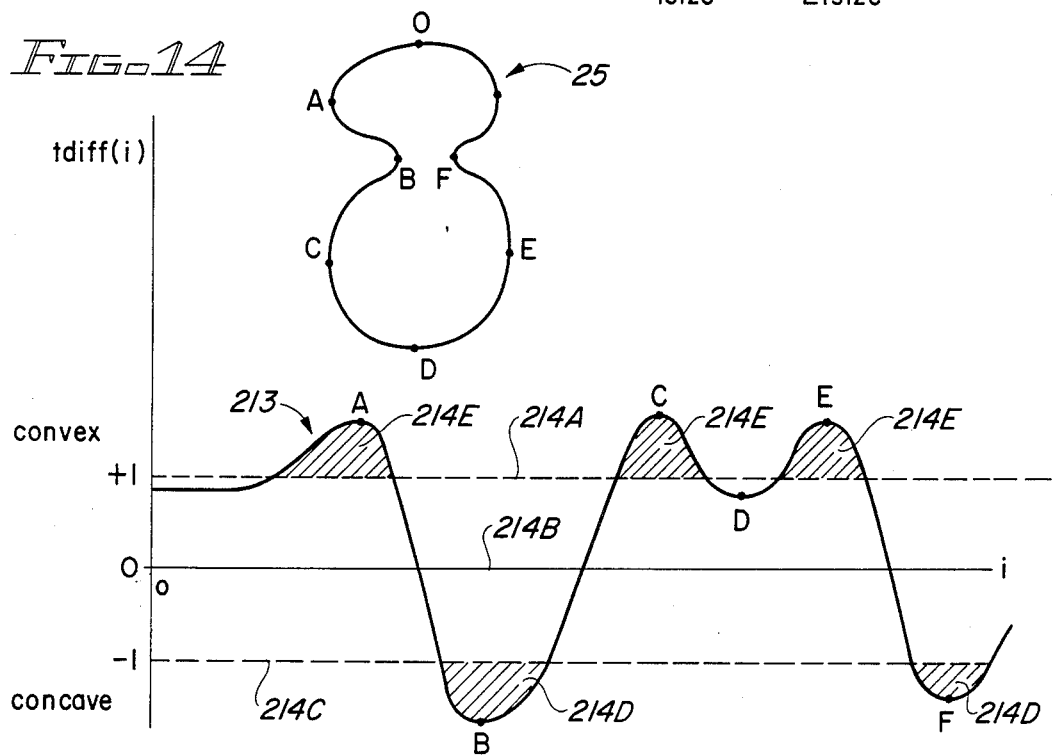
FIG.-14

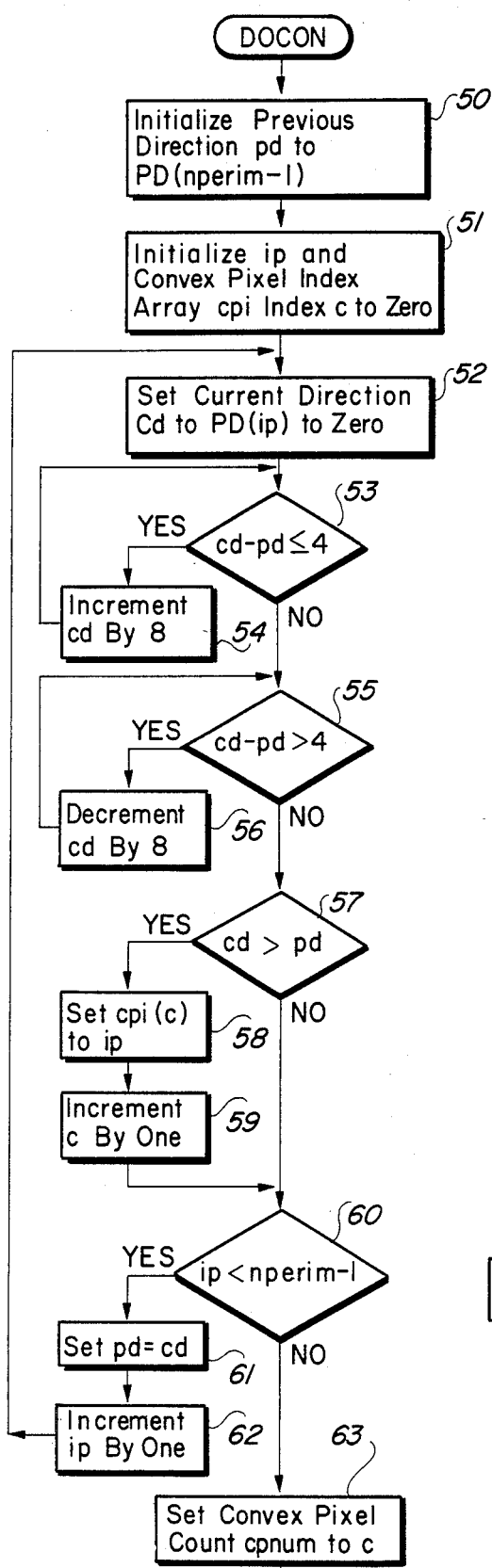
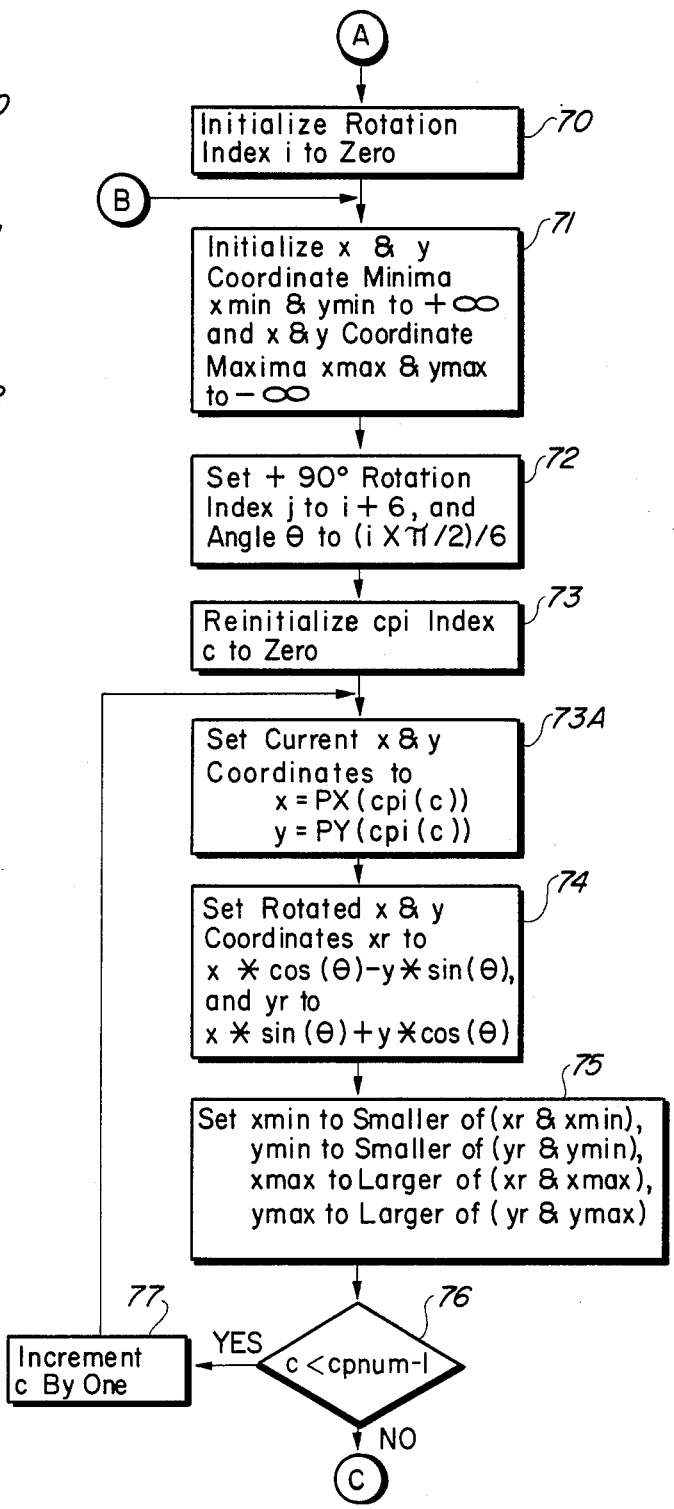
FIG. 3
FIG. 4

METHOD AND APPARATUS FOR GENERATING SIZE AND ORIENTATION INVARIANT SHAPE FEATURES

CROSS-REFERENCE TO RELATED APPLICATION

This application is related to the copending application "Method and Apparatus for Simplifying Runlength Data from Scanning of Images" by John M. Roye, Ser. No. 016,662, filed on Feb. 19, 1987, assigned to the present assignee, and incorporated herein by reference.

BACKGROUND OF THE INVENTION

The invention relates to methods and apparatus for recognizing unconnected characters, such as alphanumeric characters and the like, and more particularly to methods and apparatus for efficient extraction of features which can be more efficiently utilized by statistical decision trees to recognize electronically scanned characters, and particularly to such methods and apparatus capable of producing features which are generally size invariant and rotation invariant.

In the past, there have been two commonly used approaches to recognition of disconnected characters, one approach being a "structural" approach and the other being a "statistical" approach. In the structural approach, a character is skeletonized by means of a medial axis transformation, wellknown to those skilled in the art, and then parts of the character are identified through a spacial analysis of the skeleton. A wide variety of techniques for identifying the parts of the character are known to those skilled in the art, including analysis by means of procedural rule bases, analysis by means of one-dimensional and two-dimensional grammars, and also by means of structural decision tree analysis. The medial axis transformation is computationally very expensive. The computer processing required by the structural methodology gives rise to the identification of meaningless "false" or "noise" structures of the scanned character. In processing such noise structures, which may be very numerous for a single character, complex recognition algorithms are necessary to avoid misclassification.

The statistical approach to character recognition involves extraction of "features" from the pixel data obtained by scanning the character and feeding the extracted features into a statistical decision tree which compares them to a preselected set of features for various predefined character classes and eventually recognizes or rejects the character. Prior character extraction techniques have been confined mostly to mass sampling within a rectangular grid, generation of two-dimensional moments, Fourier transforms of certain boundary properties, the aspect ratio of the character, the thinness ratio of the perimeter length versus the number of dark pixels in the character, and the like. Prior statistical techniques for operating on extracted features generally require that the size and orientation of the characters be known. Additional adequate statistical feature extraction techniques have been devised but they generally require large amounts of computer processing time and memory capacity.

Thus, there is an unmet need in the character recognition art for an improved character feature extraction method and apparatus that produces an efficient set of size invariant, rotation invariant features that can be processed by state-of-the-art decision trees, such as those in accordance with "ISOETRP—An Interactive Clustering Algorithm with New Objectives", by C. Y. Suen and Q. R. Wang, in Pattern Recognition, Vol. 17, No. 2, pp. 211-219, 1984, incorporated herein by reference, to allow efficient statistical character recognition to be rapidly accomplished by one or more state-of-the-art microprocessors, such as the Motorola MC68020 microprocessor.

SUMMARY OF THE INVENTION

It is an object of the invention to provide a system for extracting a set of features all of which are independent of size and orientation of the character and which are efficient in recognizing the character by means of a statistical decision tree.

It is another object of the invention to provide a method and apparatus for rapidly recognizing characters using computer hardware that is much less complex than has been used in the prior art.

It is another object of the invention to generate a "robust" group of features from scanned character data wherein the features have probability distributions with differentiated means and small standard deviations.

It is another object of the invention to extract a "rich" group of features from scanned character data wherein the features are minimally correlated so as to provide substantially different information about the shape of the character.

Briefly described, and in accordance with one embodiment thereof, the invention provides a system for effectuating extraction of features of an electronically scanned character, which features are size independent and rotation independent, to be supplied to a statistical decision tree to effectuate recognition of the character. In the described embodiment, one set of features is extracted by determining a plurality of predetermined parameters of a fixed number (e.g., 6) of hypothetical minimum bounding rectangles each of which has four sides that touch four respective points of the character, each such minimum bounding rectangle being rotated relative to the others by a predetermined angle (e.g., 15 degrees). One-dimensional arrays are generated containing, respectively, the height and width of each minimum bounding rectangle, the area of each minimum bounding rectangle, the aspect ratio of each minimum bounding rectangle, the center point of each minimum bounding rectangle, and the distances between the center points of each minimum bounding rectangle. A feature is obtained by computing the length of the perimeter of the polygon defined by the center points of the minimum bounding rectangles. An array of x coordinates of each respective perimeter pixel of the character is generated, and a similar array of y coordinates of each perimeter pixel is generated. An array is generated containing the lengths of radii from the center point of the character to each perimeter pixel thereof. An array of direction codes, each having a value of 0 through 7, is generated for each pair of perimeter pixels of the character. Another array is generated containing the distance from each perimeter pixel to the next, each pixel distance being 1 if the next pixel is horizontally or vertically aligned with the present perimeter pixel, and is equal to the square root of 2 if the next perimeter pixel is diagonally aligned with the present pixel. The arrays of x and y coordinates of the perimeter pixels are resampled so that each includes a fixed number (e.g., 64) of resampled x or y coordinates, each of which is an average of an equal fraction of the total number of x or y coordinates, respectively. Two complex Fourier transforms are performed on the resampled x and y coordinates to produce two corresponding groups of eight magnitude-squared harmonic coefficients, each of which is normalized by dividing it by the sum of the eight corresponding harmonic coefficients, and then taking the square roots. The array of lengths of radii is resampled by operating on the array of pixel distances to produce a fixed number (e.g., 64) of resampled lengths of radii, each representing an equal proportion of the total perimeter length of the character. The array of direction codes is resampled by operating on it and the array of pixel distances to produce a fixed number (e.g., 64) of resampled direction codes each representing the perimeter tangent angle over equal proportions of the total perimeter length of the character. An increment of circularity is subtracted from each resampled direction code to produce an array of corrected resampled direction codes.

A moving average of the resampled direction codes is operated upon to generate a fixed number (e.g., 64) of direction code increments each of which is equal to the difference between one moving average number and the next. Each of the direction code increments is compared to a threshold, and a concavity indicator number is incremented if that direction code increment is less than the threshold, and a convexity indicator number is incremented if that direction code increment is greater than the threshold. Multiple thresholds can be specified to measure different extremes of concavity and convexity.

A fixed size array (e.g., 8) of ring variables are assigned to corresponding hypothetical contiguous ring regions of equal radius increments in a circle bounding the character. The x and y coordinates of each pixel in the character are systematically incremented to determine if the corresponding pixel is dark, and if this is the case, it then is determined in which of the ring regions the present pixel is located, and its corresponding ring variable is incremented. After all dark pixels of the character have been thereby effectively associated with a ring region, each of the ring variables is scaled by dividing it by the total number of dark pixels in the character.

A fixed size array (e.g., 24) of slice variables are assigned to corresponding hypothetical contiguous pie-shaped slice regions (e.g., subtending 15 degrees) of a bounding circle of the character. The x and y coordinates of each pixel in the character are systematically incremented to determine if the corresponding pixel is dark, and if this is the case, it then is determined in which of the slice regions the present pixel is located, and the corresponding slice variable is incremented. After all dark pixels of the character have been thereby effectively associated with a slice region, each of the slice variables is scaled by dividing it by the total number of dark pixels in the character. A real Fourier transform operation is separately performed on the bounding rectangle arrays, resampled perimeter arrays of radii lengths and corrected resampled direction codes, and the slice array to produce corresponding groups of eight magnitude-squared harmonic coefficients, each of which is normalized by dividing it by the sum of the eight harmonic coefficients, and taking their square roots. Normalized autocorrelation operations are performed on these same arrays.

The first four one-dimensional moments, namely the average, variance, skew, and kurtosis, are separately calculated for the length, area, aspect ratio, and center point distance bounding rectangle arrays, the resampled perimeter arrays of lengths of radii and direction code increments, and the ring and slice arrays. Sorting operations are performed on these same arrays, and various arithmetic combinations of sets of elements obtained therefrom are computed. Moments and sorted elements are suitably scaled by precomputed length or area variables where appropriate.

The scaled distance between the centroid of the largest hole in the character and the average of the centers of the minimum bounding rectangles of the character is computed. The ratio between the perimeter of the two largest holes of the character and the perimeter length of the character also are computed.

The set of extracted features includes the sets of eight normalized harmonic coefficients and normalized autocorrelations of selected bounding rectangle arrays, perimeter arrays, and the slice array, the four one-dimensional scaled moments and the scaled sorted elements and their various arithmetic combinations of selected bounding rectangle arrays, perimeter arrays, ring and slice arrays, the concavity and convexity indicators, the scaled sum of the distances between adjacent centers of the minimum bounding rectangles, the ratios involving the perimeters of holes of the characters, and the scaled distance between the centroid of the largest hole of the character and the center of the character.

BRIEF DESCRIPTION OF THE DRAWINGS

FIG. 1 is a generalized flow chart of the feature extraction technique of the present invention.

FIG. 2A is a diagram useful in explaining minimum bounding rectangles used in the present invention.

FIG. 2B is a diagram useful in explaining the lengths of radii and perimeter distances used in the present invention.

FIG. 2C is a diagram useful in explaining ring and slice integration used in the present invention.

FIG. 2D is a diagram useful in explaining the features hdist, hrat1, and hrat2 computed in the present invention.

FIGS. 3-6 constitute a flow chart of the DOCON subroutine of FIG. 1.

FIG. 8A is a diagram useful in understanding the operation of the flow chart of FIG. 8.

FIG. 14 is a diagram useful in understanding the operation of the subroutine of FIG. 13.

FIG. 18 is a flow chart of the MOMENT subroutine of FIG. 1A.

FIG. 19 is a flow chart of the SORT subroutine of FIG. 1A.

DESCRIPTION OF THE INVENTION

At the outset, it should be understood that the feature extraction technique of the present invention receives a group of input variables, listed in Table 1, from a file that has been produced in response to line-by-line scanning of a document containing the characters to be recognized. Those skilled in the art are familiar with a variety of well-known border tracking algorithms that produce various input variables which are usable in a character recognition system by operating on pixel data produced by scanning the object. In the presently preferred embodiment of the invention, a conventional border scanning subroutine operates on an "object" or object file produced by the "object builder" described in detail in the above-referenced copending Roye application. That object includes all of the pixel data of the character to be recognized, assembled as horizontal slices that correspond to the geometric structure of the character on the document scanned.

Table 1 shown directly below is a list of the input variables produced by the above border tracking routine and definitions of those variables.

TABLE 1

| | Input Variables |
|---|---|
| P(x,y) | binary pixel image (0 = light / 1 = dark), where all dark pixels are connected |
| x | x coordinate of P(x,y): 0 <= x <= mx |
| y | y coordinate of P(x,y): 0 <= y <= mx |
| mx | maximum x coordinate of P(x,y) = 1 |
| my | maximum y coordinate of P(x,y) = 1 |
| npix | number of dark pixels P(x,y) = 1 |
| PX(ip) | counter-clockwise traced from upper leftmost P(x,y) = 1 perimeter pixel x coordinates |
| PY(ip) | counter-clockwise traced from upper leftmost P(x,y) = 1 perimeter pixel y coordinates |
| PD(ip) | 8-way directions (0–7) from perimeter pixel ip to ip+1 (or 0 if last pixel) |
| ip | perimeter pixel index: 0 <= ip <= nperim − 1 |
| nperim | number of perimeter pixels |
| perim | perimeter length (adding 1 for each horizontal or vertical (even) direction, and 2 for each diagonal (odd) direction) |
| HX(ih) | counter-clockwise traced from upper leftmost P(x,y) = 0 largest hole border pixel x coordinates |
| HY(ih) | counter-clockwise traced from upper leftmost P(x,y) = 0 largest hole border pixel y coordinates |
| HD(ih) | 8-way directions (0–7) from largest hole border pixel ih to ih+1 (or 0 if last pixel) |
| ih | largest hole border pixel index: 0 <= ih <= nhole |
| nhole | number of largest hole border pixels (0 if none) |

TABLE 1-continued

| | Input Variables |
|---|---|
| ahole | largest nhole border length (0 if none) |
| bhole | second largest hole border length (0 if none) |

Figure 2:
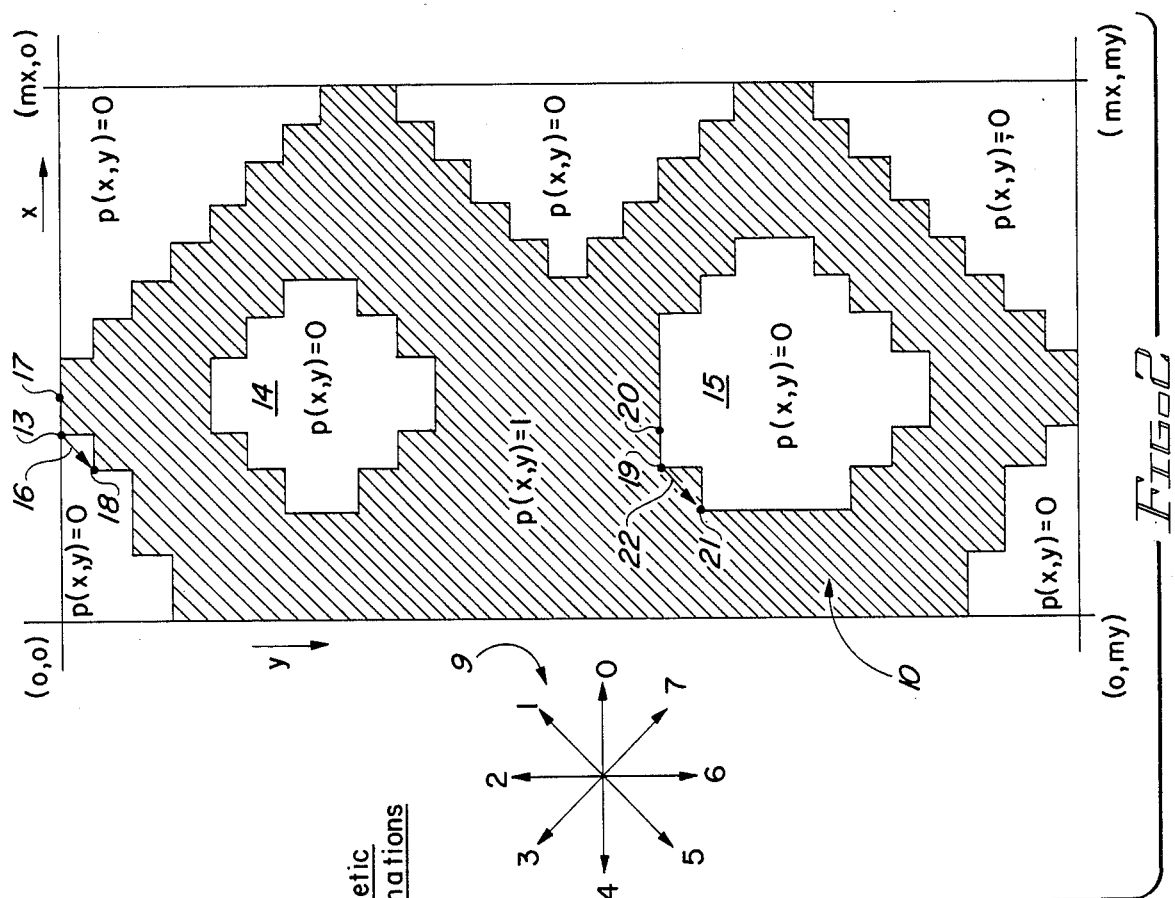
FIG. 2 is a diagram useful in explaining various input variables utilized by the feature extraction process of FIG. 1.

FIG. 2 is a diagram of a character to be recognized, having the shape of a "B". It will be convenient to refer to FIG. 2 in describing the input variables of Table 1. In Table 1 P(x,y) is a two-dimensional array, and represents the binary pixel image. If P(x,y) is a "1" at the present x,y coordinate, it represents a dark pixel; similarly, if P(x,y) is a "0", it represents a light or transparent pixel at the coordinate x,y. As indicated along x axis 11 in FIG. 2, x can have any value between 0 and mx. Similarly, as indicated by y axis 12 in FIG. 2, y can have any value between 0 and my. The minimum bounding rectangle at 0 rotation is defined by the points 0,0 0,mx, mx,my and 0, my as shown. The total number of dark pixels in character 10, i.e., the number of pixels for which P(x,y) equals "1", is equal to npix.

PX(ip) is a one-dimensional array of the x coordinates of the nperim perimeter or pixels of character 10. The index variable ip can have any value between 0 and nperim−1, where nperim is the total number of perimeter pixels of character 10. Similarly, PY(ip) is a one-dimensional array of all of the y coordinates of the nperim perimeter pixels of character 10. The PX(ip) and PY(ip) arrays are listed in order of perimeter points traced counter-clockwise from the upper, leftmost pixel of character 10, that is, from point 13 in FIG. 2. If character 10 is preprocessed by a program that, for example, "smooths", "thins", or "decomposes" the character, then the PX(ip) and PY(ip) arrays would represent the perimeter(s) of the result(s).

The one-dimensional array PD(ip) represents one of eight directions from a perimeter pixel ip to the next perimeter pixel ip+1 as the boundary of the character is traced counter-clockwise. PD(ip) can take any value from 0 through 7, as indicated in 9 of FIG. 2A, in which the eight directions representing 0 degrees, 45 degrees, 90 degrees, 135 degrees, 180 degrees, 270 degrees, and 315 degrees are represented by the codes 0, 1, 2, 3, 4, 5, 6, and 7, respectively. Thus, the group of three arrays PX(ip), PY(ip), and PD(ip) represent all of the perimeter points and directions between consecutive pixels for the character 10. (Note that the PD(ip) array could be easily derived from P(x,y) or PX(ip), and PY(ip).)

The variable perim represents the total perimeter length for the character 10. This length is determined by summing all of the distances between consecutive pixels as the perimeter of character 10 is traced counter-clockwise from pixel 13 back to pixel 17. For each even-numbered value of PD(ip), the length of the horizontal or vertical distance, i.e., 1 is added to perim, and for each odd-numbered value of PD(ip), the length of the diagonal distance (such as 16 or 19 in FIG. 2), i.e., the square root of 2, is added to perim, in order to obtain the total perimeter length of character 10.

HX(ih), HY(ih), and HD(ih) are the x coordinate, y coordinate, and direction code arrays for the largest hole border pixels, and are similar to PX(ip), PY(ip), and PD(ip), except that the former contain hole border x and y coordinates, and direction codes, respectively, if the character has a hole in it. ih is the largest hole border pixel index and can assume any value between 0 and nhole−1, where nhole is the total number of border pixels in the largest hole 15 of character 10. In FIG. 2, reference numerals 14 and 15 represent holes. Point 19 represents the starting point for tracing the boundary of hole 15 counter-clockwise back to point 20. As shown in FIG. 2, P(x,y) is 1 everywhere the character is dark. In locations of holes in the character, such as holes 14 and 15, P(x,y) is 0. Light pixels are everywhere indicated by P(x,y)×0 in FIG. 2.

The length of the largest hole border, i.e., the length of the boundary of hole 15, is represented by the variable "ahole", and has a value 0 if there is no hole in the character. The variable "bhole" is the border length of the second largest hole, i.e., of hole 13 in character 10 if there is a second hole. If there is no second hole, bhole has a value of 0.

Before describing the feature extraction program of the present invention, which is described with reference to the flow chart of FIG. 1 and the various subroutines called thereby, it will be helpful to first describe in some detail the computed variables, which are listed in Table 2, set forth below.

TABLE 2

| Computed Variables | |
|---|---|
| clen(0–11) | lengths of sides of the bounding rectangles of P(x,y) rotated every 15 degrees |
| cprd(0–5) | areas of the bounding rectangles of P(x,y) rotated every 15 degrees |
| cdiv(0–5) | aspect ratios of the bounding rectangles of P(x,y) rotated every 15 degrees |
| cxcp(0–5) | x coordinates of the center points of the bounding rectangles of P(x,y) rotated every 15 degrees |
| cycp(0–5) | y coordinates of the center points of the bounding rectangles of P(x,y) rotated every 15 degrees |
| cx | average x coordinate of the bounding rectangle center points |
| cy | average y coordinate of the bounding rectangle center points |
| cdist(0–14) | distances between the center points of every bounding rectangle |
| cdsum | sum of the distances between adjacent bounding rectangle center points scaled by perim |
| xproj(ip) | array of nperim x coordinates of the perimeter pixels (same as PX(ip)) |
| yproj(ip) | array of nperim y coordinates of the perimeter pixels (same as PY(ip)) |
| plen(ip) | array of nperim distances between adjacent perimeter pixels (1 if PD(ip) even / $\sqrt{2}$ if PD(ip) odd) |
| prad(ip) | array of nperim distances from (cx,cy) to each (PX(ip),PY(ip)) |
| ptan(ip) | array of nperim directions between adjacent perimeter pixels (same as PD(ip)) |
| prmax | maximum distance from (cx,cy) to (PX(ip), PY(ip)0 |
| xsamp(0–63) | resampled x projection of perimeter from xproj |
| ysamp(0–63) | resampled y projection of perimeter from yproj |
| rsamp(0–63) | resampled perimeter radii from plen and prad |
| tsamp(0–63) | resampled perimeter tangents from plen and ptan |
| tnorm(0–63) | normalized perimeter tangents from tsamp |
| tdiff(0–63) | smoothed differences of perimeter tangents from tsamp |
| ccoef(1–8) | first 8 complex Fourier coefficients (method 1) from xsamp and ysamp scaled by sum of squares |
| dcoef(1–8) | first 8 complex Fourier coefficients (method 2) from xsamp and ysamp scaled by sum of squares |
| thisum | sum of perimeter tangent differences above given threshold from tdiff |
| tlosum | sum of perimeter tangent differences below given threshold from tdiff |
| ring (0–7) | concentric rings of equal radius increment from radially sampled P(x,y) scaled by npix |

TABLE 2-continued

| Computed Variables | |
|---|---|
| slice(0–23) | adjacent 15 degree slices of equal area from radially sampled P(x,y) scaled by npix |
| hx | x coordinate of largest hole border centroid |
| hy | y coordinate of largest hole border centroid |
| hdist | ratio of distance between (hx,hy) and (cx,cy) to prmax |
| hrat1 | ratio of ahole to perim |
| hrat2 | ratio of bhole to perim |

In Table 2 some of the computed variables are merely intermediate variables, while others are the desired extracted features of the character to be recognized, and are supplied as inputs to a suitable statistical decision tree, such as one of the type described in the above-referenced Suen articles.

Before describing the computed variables of Table 2, it will be helpful to refer to FIG. 2A, in which reference numeral 25 again designates a hypothetical character to be recognized. Numeral 32-0 represents a first minimum bounding rectangle of character 25. In accordance with the present invention, a second minimum bounding rectangle 32-1 can also be drawn, rotated 15 degrees relative to the original x and y axes. Four further minimum bounding rectangles (not shown), each rotated 15 degrees clockwise (or counter-clockwise) relative to the next, also can be drawn. Each of the six minimum bounding rectangles may have a different center and a different height and a different width. clen(0) represents the height of the first minimum bounding rectangle 32-0, clen(7) is the width of that minimum bounding rectangle, clen(2) is the height of the first rotated minimum bounding rectangle 32-1, clen(8) is the width of rectangle 32-1, etc., so that a set of variables clen(0), ... . clen(11) represents the lengths of two perpendicular sides of all six rotated minimum bounding rectangles of P(x,y).

cprd(0), cprd(1), ... cprd(5) are the areas of the six minimum bounding rectangles of P(x,y). cdiv(0), ... cdiv(5) are aspect ratios of each of the six minimum bounding rectangles, each equal to the shorter clen value of that rectangle divided by its longer clen value, so that all values of cdiv(0–5) are less than or equal to 1.

The variables cxcp(0), ... cxcp(5) are the x coordinates of the six center points of the respective minimum bounding rectangles. cycp(0), ... cycp(5) are the y coordinates of the six center points of the respective minimum bounding rectangles. cx is the average x coordinate of the six minimum bounding rectangle center points, and cy is the average y coordinate of the six minimum bounding rectangle center points. cx,cy is used herein as the center point or center of the character. The 15 variables cdist(0), ... cdist(14) represent the 15 possible distances between the six minimum bounding rectangle center points, cdsum is equal to the sum of the distances between the six adjacent (with respect to rotation angle) minimum bounding rectangle center points, which is the length of the perimeter of the polygon indicated by arrow 25A of FIG. 2A, defined by the center points 26-0 26-1, etc.

The array xproj(ip) is set to PX(ip) (as will be explained with reference to FIG. 7). Similarly, the yproj(ip) array is set to PY(ip) in FIG. 7. Thus, xproj(ip) and yproj(ip) are arrays of x and y coordinates, respectively, of the perimeter pixels taken in counter-clockwise order from the upper leftmost pixel of the character. ptan(ip) is a direction code array that is set to PD(ip) in FIG. 7, and thus is an array of the directions between adjacent perimeter pixels.

The prad(ip) array of distances from each of the nperim perimeter points of the character 10 from the character center (also identified by numeral 26 in FIG. 2B) to that perimeter point. For example, the distances prad(0), prad(1), and prad(2) are designated by arrows 34-0, 34-1, and 34-2 in FIG. 2C. The corresponding perimeter points are designated by points 33-0, 33-1, 33-2 in FIG. 2B. xproj(0), xproj(1), and xproj(2) are the x coordinates of perimeter points 33-0, 33-1, and 33-2, respectively. yproj(0), yproj(1), and yproj(2) are the y coordinates of those same three perimeter points. prmax is the maximum length of any of the radii 34-0, 34-1, etc., of the character 25 taken around its entire perimeter, i.e., is the maximum value of prad(ip). plen(ip) is an array of the distances of each of the nperim perimeter points 33-0, 33-1, . . . 33 to the next. This distance is either 1 or the square root of 2, depending upon whether the corresponding PD(ip) is even or odd, respectively. The remaining computed variables in this section of Table 2 can be best understood by reference to the remaining flow charts. The resampling techniques of the present invention are best understood with reference to the flow charts that outline the resampling process. The Fourier coefficients are best understood by reference to the flow charts which show those formulas.

The computed variables ring(0-7) represent one of eight concentric rings each having the same radius increment. This can be understood by reference to FIG. 2C, in which reference numeral 25 again designates a hypothetical character to be recognized. As in FIG. 2, the x axis and y axis are indicated by numerals 11 and 12, respectively. The character center is designated by reference numeral 26. The maximum of the radii drawn from the center point 26 to each perimeter pixel, prmax, is indicated by arrow 31. Eight concentric circles 27-0, 27-1, . . . 27-7 are drawn around center 26 to form the eight rings. The value of each ring variable is equal to the number of dark pixels of the character P(x,y) about which that ring is drawn divided by npix, the total number of pixels in the character.

Twenty-four pie-shaped slices, each subtending a 15 degree angle, are designated by reference numerals 30-0, 30-1, . . . 30-23. The first slice 30-0 is defined by radius 29-1, which makes a −7.5 degree angle with respect to a horizontal axis 28 extending through center point 26 and radius 29-1, which makes a +7.5 degree angle with respect to axis 28. Numerals 29-2 and 29-23 bound other slices as shown in FIG. 2C. The value of each slice variable is equal to the number of dark pixels of the character P(x,y) about which that slice is drawn divided by npix.

The variables hx, hy, hdist, hrat1, and hrat2 can be understood with reference to FIG. 2D. Referring now to FIG. 2D, character 25 in the shape of an "8" is shown having a large hole 35 and a small hole 36. (English alphanumeric characters fall into three classes, those with no holes, those with one hole and those with two holes.) The point hx,hy designated by numeral 37 is the centroid of the largest hole 35 with respect to its boundary. As before, the center of character 25 is point cx,cy, designated by numeral 26. hdist is the distance 38 between largest hole centroid 37 and character center 26, indicated by line 38 in FIG. 2D divided by the maximum radius prmax, indicated by line 39. hrat1 is the ratio of the largest hole 35 bounding border length ahole to the character perimeter perim. hrat2 is the ratio of the bounding hole border length of smaller hole 36 to the character perimeter length perim. The values of hrat1 and hrat2 also are very useful in distinguishing between "noise holes" that might appear in a hand-drawn character like a "K", and provide a way of discriminating between such noise holes and intended holes like the ones in the "8" of FIG. 2D.

Figure 21:
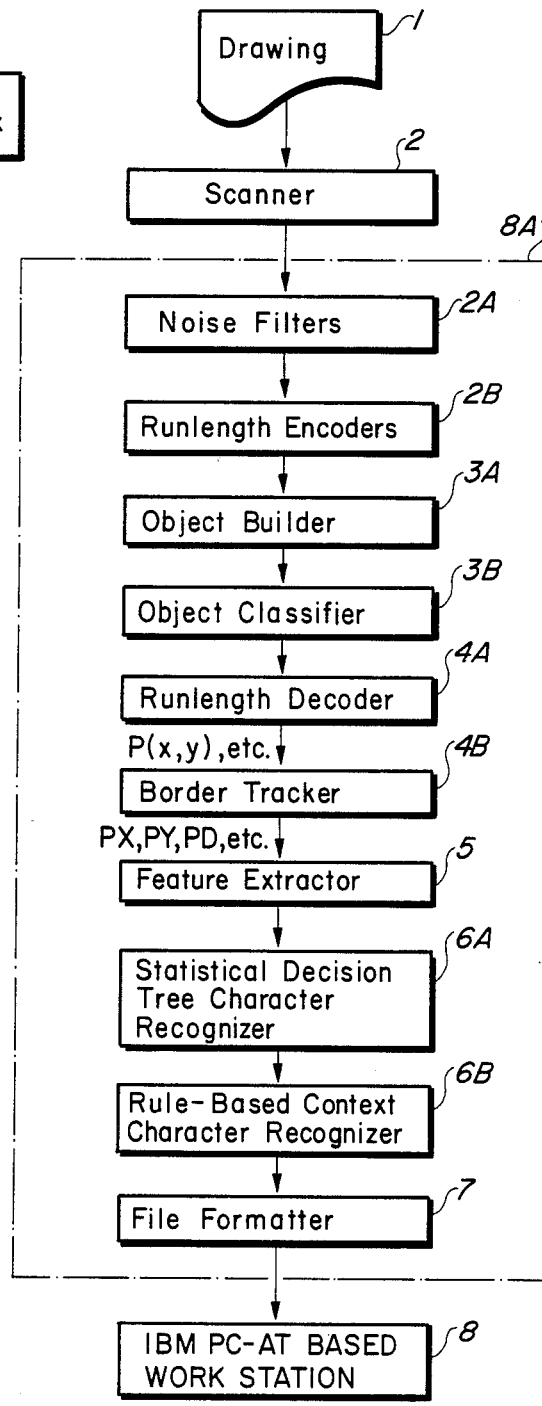
FIG. 21 is a diagram of a document recognition system in which the feature extraction program of FIG. 1 is embodied.

Before describing the feature extraction program in detail, it will be helpful to first refer to FIG. 21, which is a diagram illustrating the structure of the document scanning system in which the feature extraction system of the present invention is incorporated. In FIG. 21, a scanner 2 scans a hand-drawn document 1, producing pixels which are filtered by noise filters 2A, the output of which is fed into a runlength encoder 2B. The runlength encoder 2B produces raw runlengths that are "built" into "objects" consisting of raw runlengths or horizontal slices arranged in a manner corresponding to the configuration of objects scanned on drawing 1, as described in the above-referenced Roye application. An object classifier 3B determines from size and other geometric properties whether an object is small enough to be classified as a character, and if it is, feeds raw runlengths of the object into a runlength decoder 4A that converts the object runlengths back into the pixel image, i.e., to P(x,y) and computes mx,my and npix. A border tracker 4B then operates upon P(x,y) to produce the remaining input variables shown in Table 1.

Figure 1A:
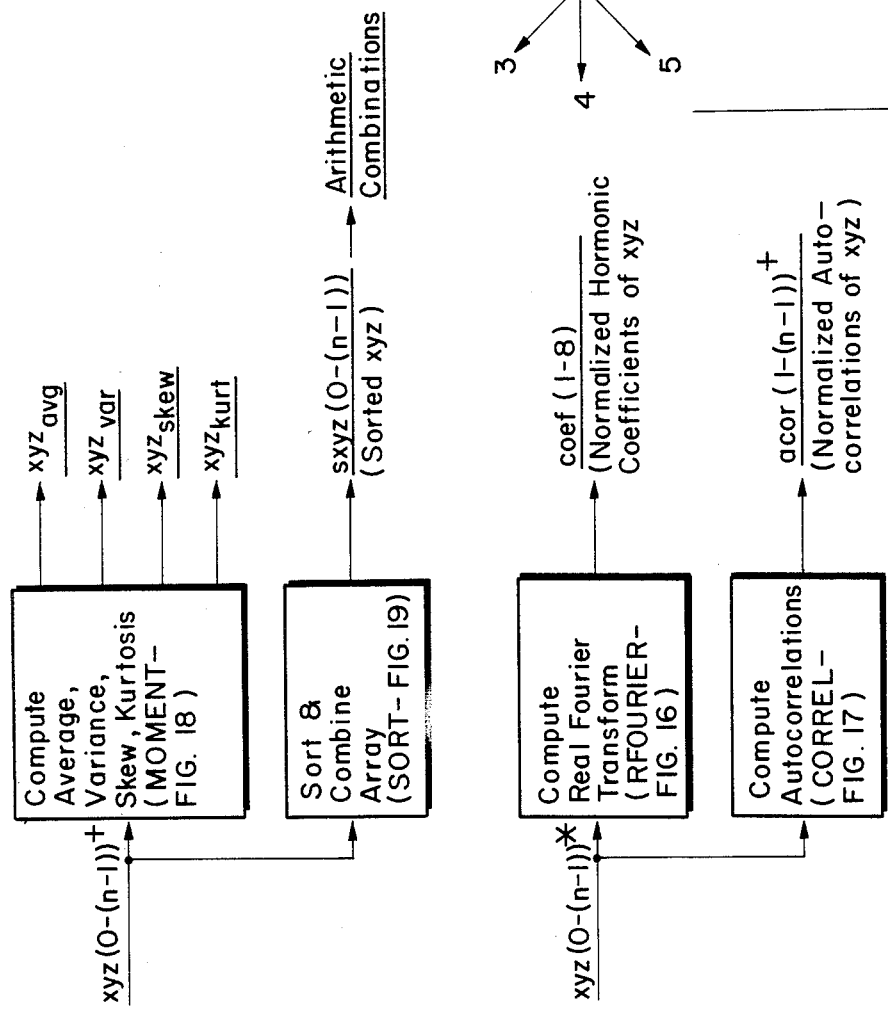
FIG. 1A is a flow chart of the subroutines called by the flow chart of FIG. 1 to compute various features.

The feature extraction system of the present invention is designated by reference numeral 5 in FIG. 21, producing intermediate computed variables and extracted features included in Table 2 and indicated in FIGS. 1 and 1A. The extracted features are fed into a decision tree classifier 6A, the output of which is fed through a rule based character context routine 6B and from there into a formatter 7, the output of which is loaded for editing into a workstation 8 including an IBM PC-AT computer, a keyboard, a high resolution graphics monitor, a high resolution plotter, a hard disk, and other suitable hardware.

All of the blocks shown in FIG. 21 except drawing 1, scanner 2, and workstation 8 are included in a graphics processor 8A that includes a number of 68020 microprocessors and suitable memory.

Figure 16:
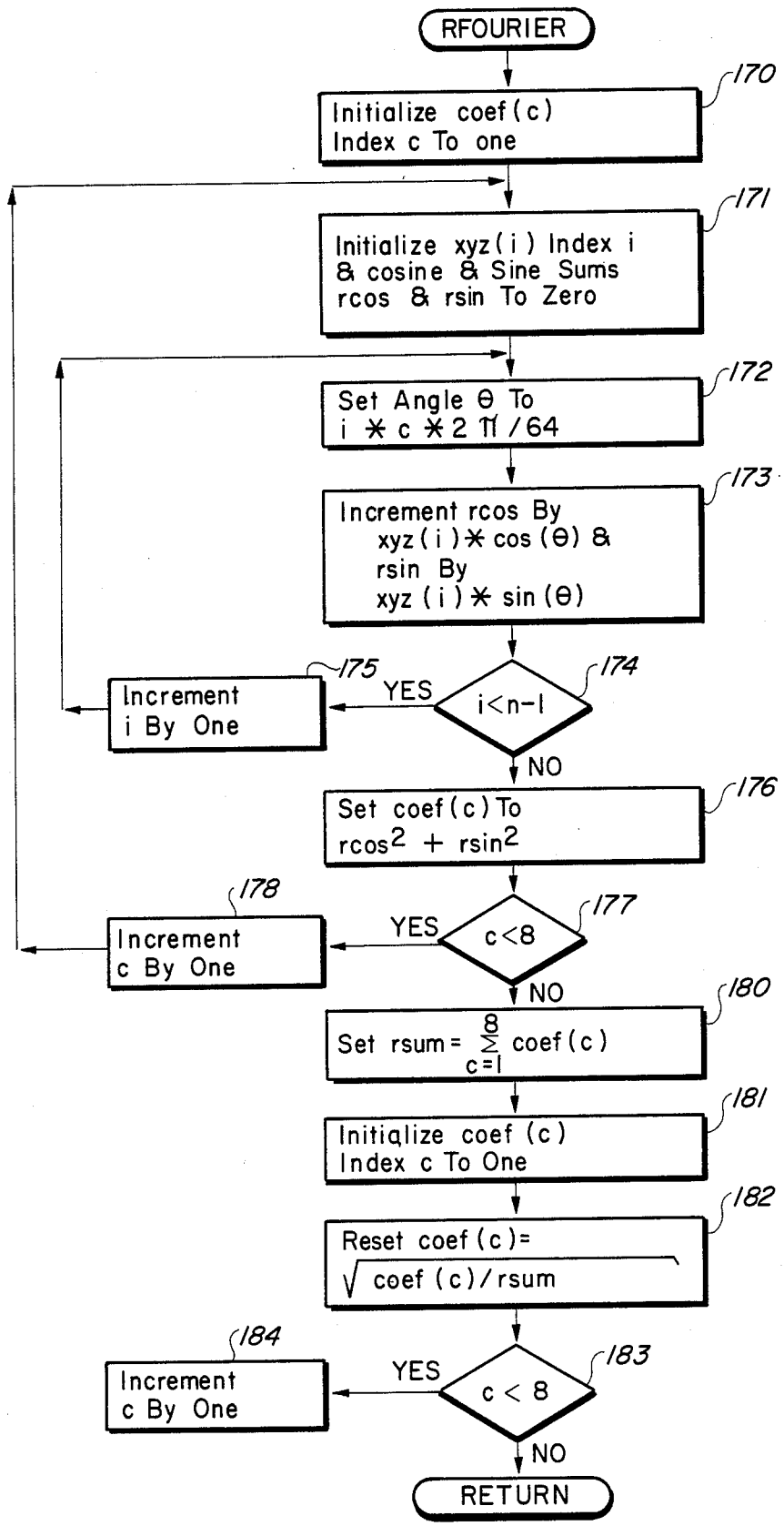
FIG. 16 is a flow chart of the RFOURIER subroutine of FIG. 1.
Figure 17:
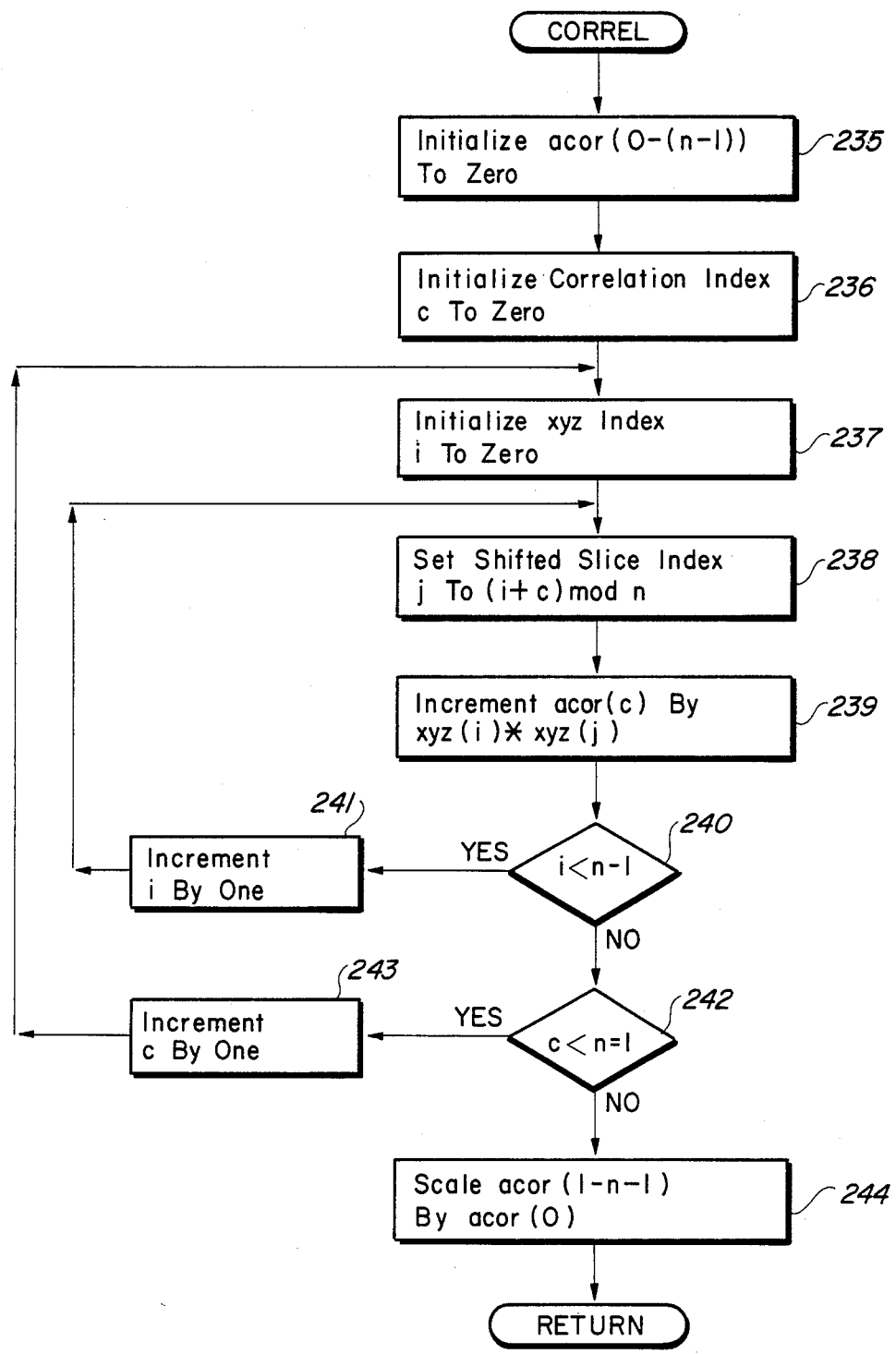
FIG. 17 is a flow chart of CORREL subroutine of FIG. 1.

Referring next to FIG. 1, names of subroutines are contained within blocks, and are represented by capital letters. When a computed array represented by small letters is followed by *, the RFOURIER subroutine of FIG. 16 is executed to compute a set of eight normalized harmonic coefficients of that array, and the CORREL subroutine of FIG. 17 is executed to compute a set of n normalized autocorrelations of that array with n elements. When a computed array of variables represented by small letters is followed by +, the MOMENT subroutine of FIG. 18 is executed to compute the average, variance, skew, and kurtosis of that array, as indicated in FIG. 1A and the SORT subroutine of FIG. 19 is executed to perform a predetermined sorting of that array and various arithmetic combinations of the sorted elements. In FIG. 1, any computed variables or arrays of variables that are underscored in either FIG. 1 or FIG. 1A are extracted features, which are supplied to the above-mentioned statistical decision tree which performs the character recognition function. Moment and sort variables are subject to division by scaling factors, as subsequently explained, to insure size invariance.

Referring to FIG. 1, the input variables PX(ip), PY(ip), PD(ip), nperim, and perim are input variables to the DOCON subroutine 11. The DOCON subroutine effectively draws six minimum bounding rectangles around a character such as character 25 in FIG. 2B, each minimum bounding rectangle being rotated 15 degrees relative to the previous rectangle so that there are six minimum bounding rectangles oriented at 0 degrees, 15 degrees, 30 degrees, 45 degrees, 60 degrees, and 75 degrees.

The output variables clen(0–11), cprd(0–5), and cdiv(0–5) are produced by the DOCON subroutine of FIGS. 3–6. The real Fourier transform subroutine of FIG. 16 operates on the clen, cprd, and cdiv arrays to produce the clcoef(1–4), cpcoef(1–2), and cdcoef(1–2) normalized harmonic coefficients, which are extracted features. Also, the autocorrelation subroutine of FIG. 17 operates on these same arrays to produce the clcor(1–11), cpcor(1–5), and cdcor(1–5) normalized autocorrelations which are extracted features.

The DOCON subroutine of block 11 also computes the cdist(0–14), cx and cy variables, and the cdsum feature. Also, the clen, cprd, cdiv, and cdist arrays are operated upon by the MOMENT and SORT subroutines, the outputs of which then are scaled to produce extracted features as indicated in FIG. 1A.

Figure 7:
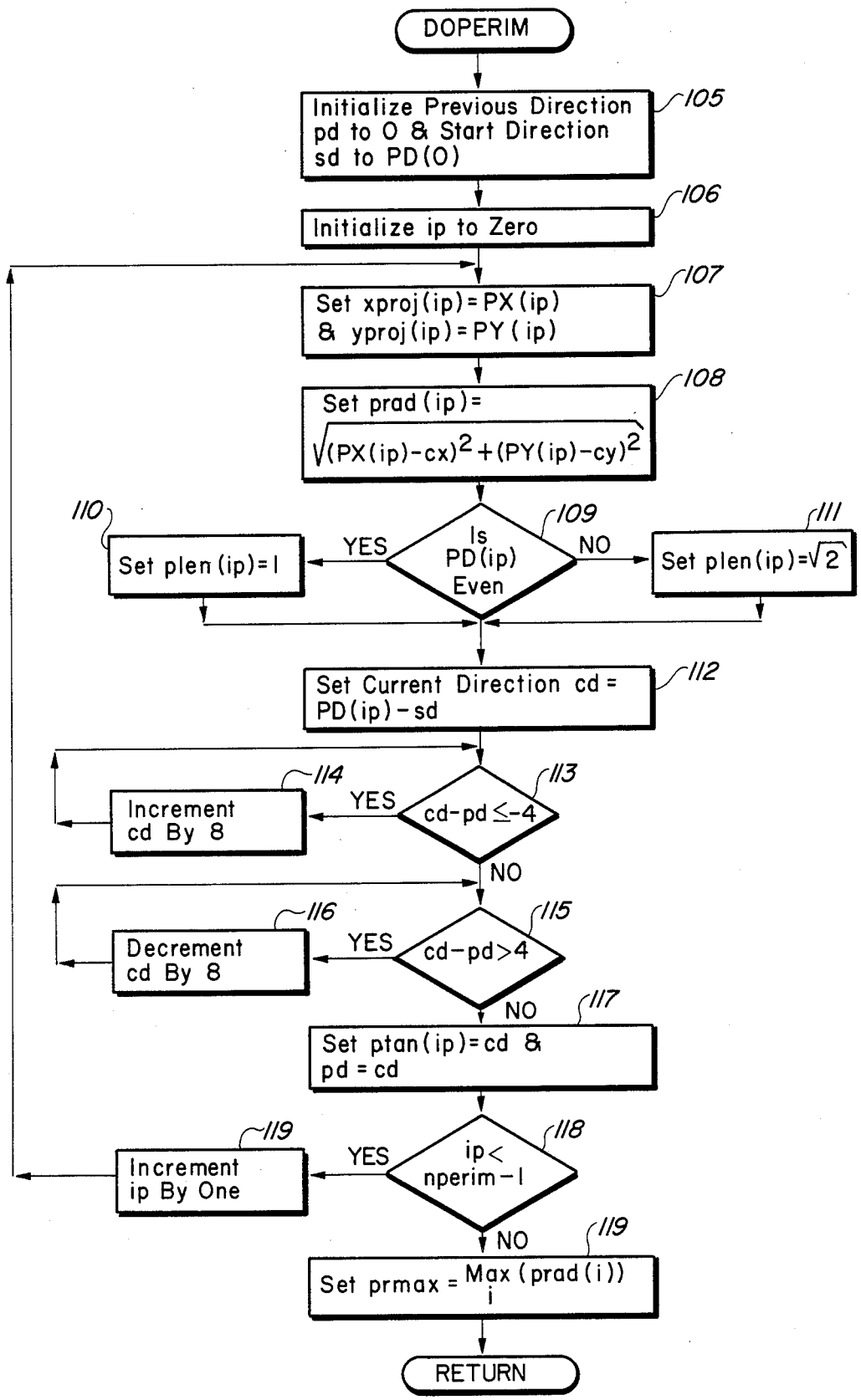
FIG. 7 is a flow chart of the DOPERIM subroutine of FIG. 1.

The input variables PX(ip), PY(ip), PD(ip), nperim, perim, and the computed variables cx and cy are operated on by the DOPERIM subroutine of FIG. 7 to perform an analysis of points around the perimeter of the character from which features are to be extracted. The DOPERIM subroutine 12 computes the xproj(ip), yproj(ip), prad(ip), ptan(ip), and plen(ip) arrays. DOPERIM also computes the prmax variable used by DORAD and DOHOLE.

The xproj and yproj arrays, each of which includes a number of values equal to the number of pixels on the boundary of the character from which features are to be extracted, are operated upon by the FSAMP subroutine as indicated in block 14 of FIG. 1, which "resamples" the xproj and yproj arrays to reduce (or increase) the number of points from nperim to 64, and thereby produce the xsamp(0–63) array and ysamp(0–63) array. In most cases, the 64 resampled points represent a very substantial reduction from the original number of perimeter pixels without a substantial loss in accuracy of the extracted features. A dual complex Fourier transform subroutine of FIG. 9 then operates on the xsamp and ysamp arrays together to produce two sets of eight harmonic coefficients. Each of these harmonic coefficients then is normalized in FIG. 10 by dividing it by the sums of the set of eight harmonic coefficients to which it belongs, and then taking its square root to thereby produce the size invariant, rotation invariant harmonic coefficient arrays ccoef(1–8) and dcoef(1–8).

The prad(ip) and ptan(ip) arrays produced by DOPERIM each are operated upon by the "parametric resampling" subroutine PFSAMP, as indicated in block 24 of FIG. 1, using plen(ip) to produce the rsamp(0–63) array and tsamp(0–63) array, each of which has 64 points. The PFSAMP subroutine also produces the tnorm(0–63) array when operating on the ptan(ip) array. The real Fourier transform subroutine of FIG. 16 operates upon the rsamp and tnorm arrays to produce rcoef(1–8) and tcoef(1–8) normalized harmonic coefficients, which are extracted features. Also, the autocorrelation subroutine of FIG. 17 operates on these scanned arrays to produce the rcor(1–63) and tcor(1–63) normalized autocorrelations, which are extracted features. Also, the rsamp array is operated upon by the MOMENT and SORT subroutines, the outputs of which are then scaled to produce extracted features as indicated in FIG. 1A.

Figure 12:
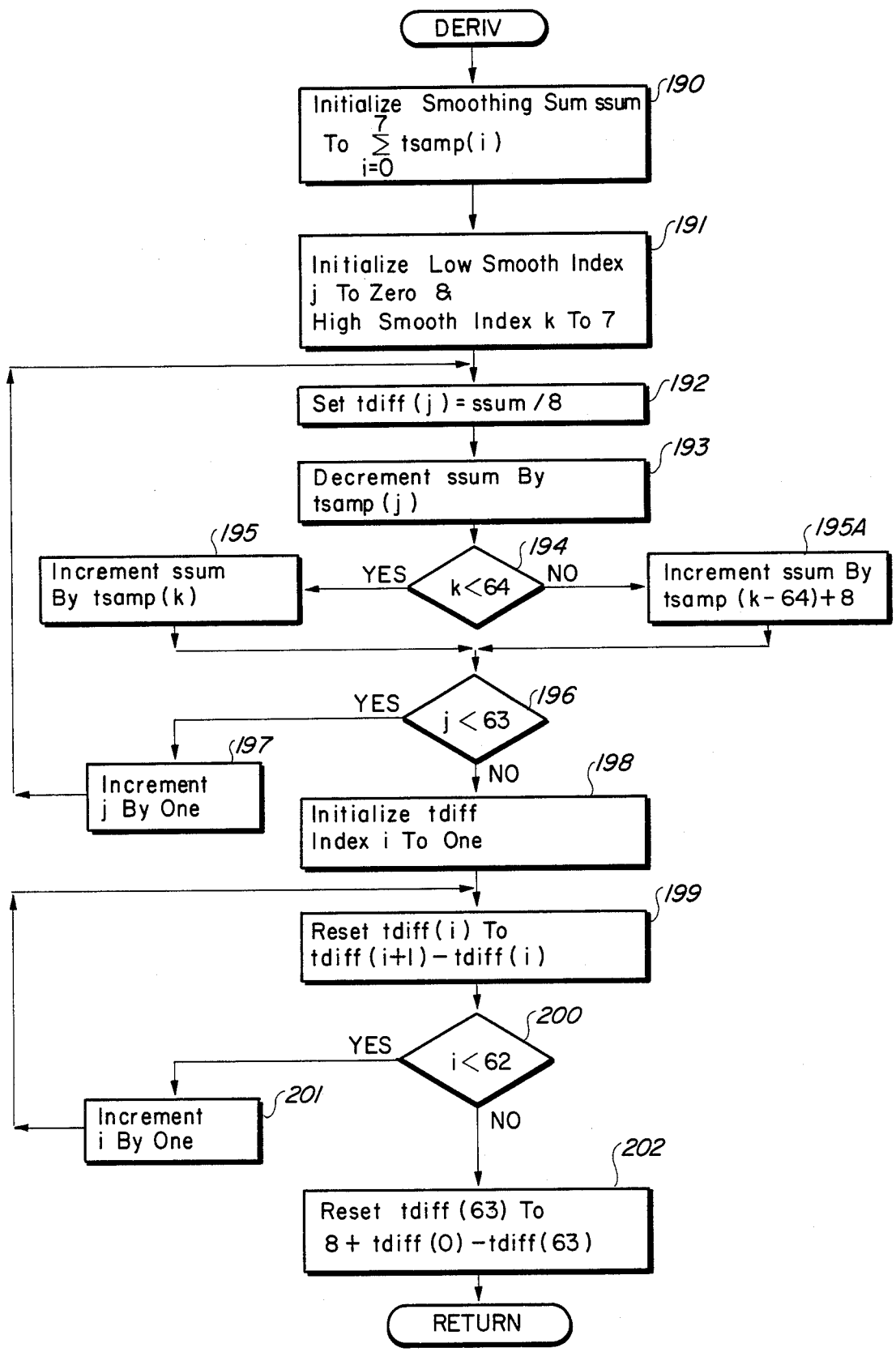
FIG. 12 is a flow chart of the DERIV subroutine of FIG. 1.

The tsamp(0–63) array is operated upon by the DERIV subroutine of FIG. 12, as indicated in block 22, to produce the tdiff(0–63) array. This array is operated upon by the HILOSUM subroutine of FIG. 13, as indicated in block 23 of FIG. 1, to produce thisum and tlosum, which are indicative of prominent convexities and concavities of the character to be recognized. This array also is operated on by the MOMENT and SORT subroutines, the outputs of which are scaled to produce further extracted features as indicated in FIG. 1A.

Figure 15:
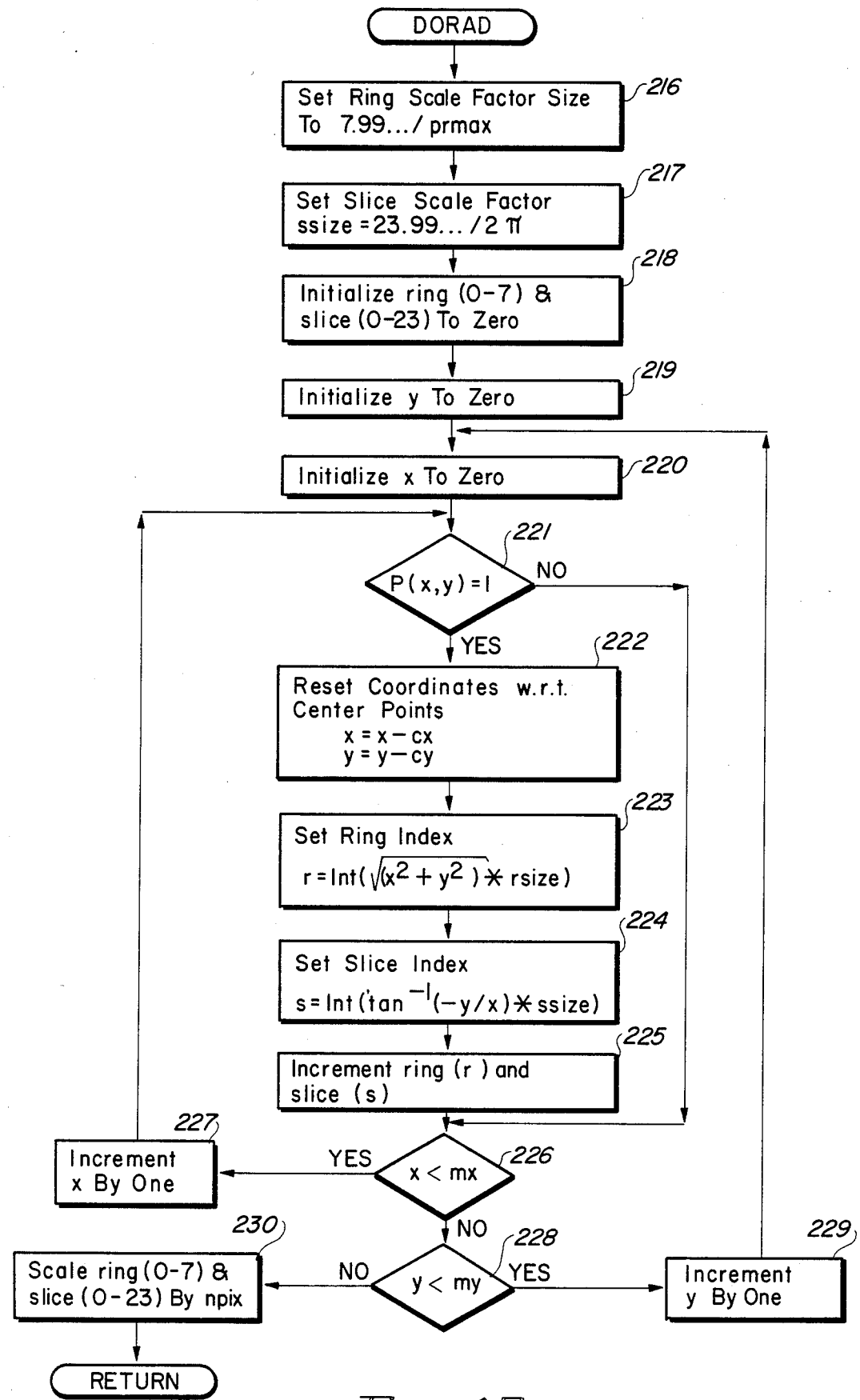
FIG. 15 is a flow chart of the DORAD subroutine of FIG. 1.

The DORAD subroutine of FIG. 15 designated by block 30 in FIG. 1, operates on P(x,y) and npix and prmax to produce the ring(0–7) array and slice (0–23) array. The ring (0–7) array is itself an extracted feature. The real Fourier transform subroutine of FIG. 16 operates on the slice array to produce the scoef(1–6) normalized harmonic coefficients which are extracted features. Also, the autocorrelation subroutine of FIG. 17 operates on the slice array to produce the scor(1–23) normalized autocorrelations which are extracted features. The ring and slice arrays are operated on by the MOMENT and SORT subroutines to produce extracted features as indicated in FIG. 1A.

Figure 20:
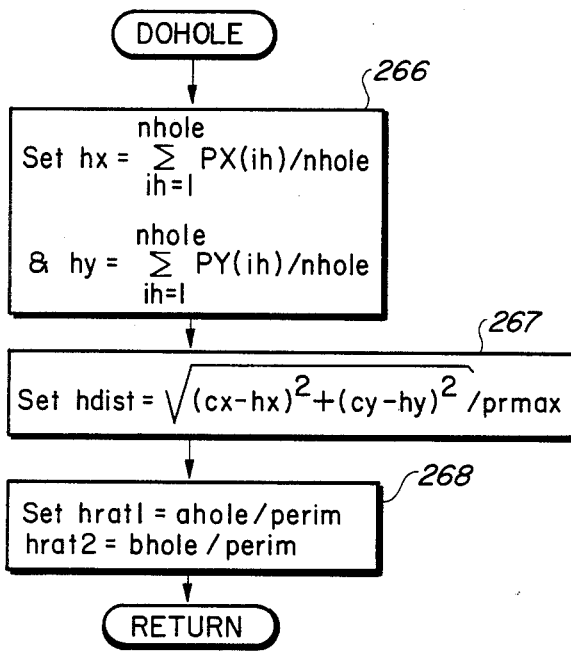
FIG. 20 is a flow chart of the DOHOLE subroutine of FIG. 1.

The DOHOLE subroutine of FIG. 20, designated by reference numeral 33 in FIG. 1, operates upon the HX(ih), HY(ih), nhole, cx, cy, and prmax variables to produce the hdist extracted feature, and simple ratios are taken between ahole, bhole and perim to compute the hrat1 and hrat2 extracted features.

Figure 5:
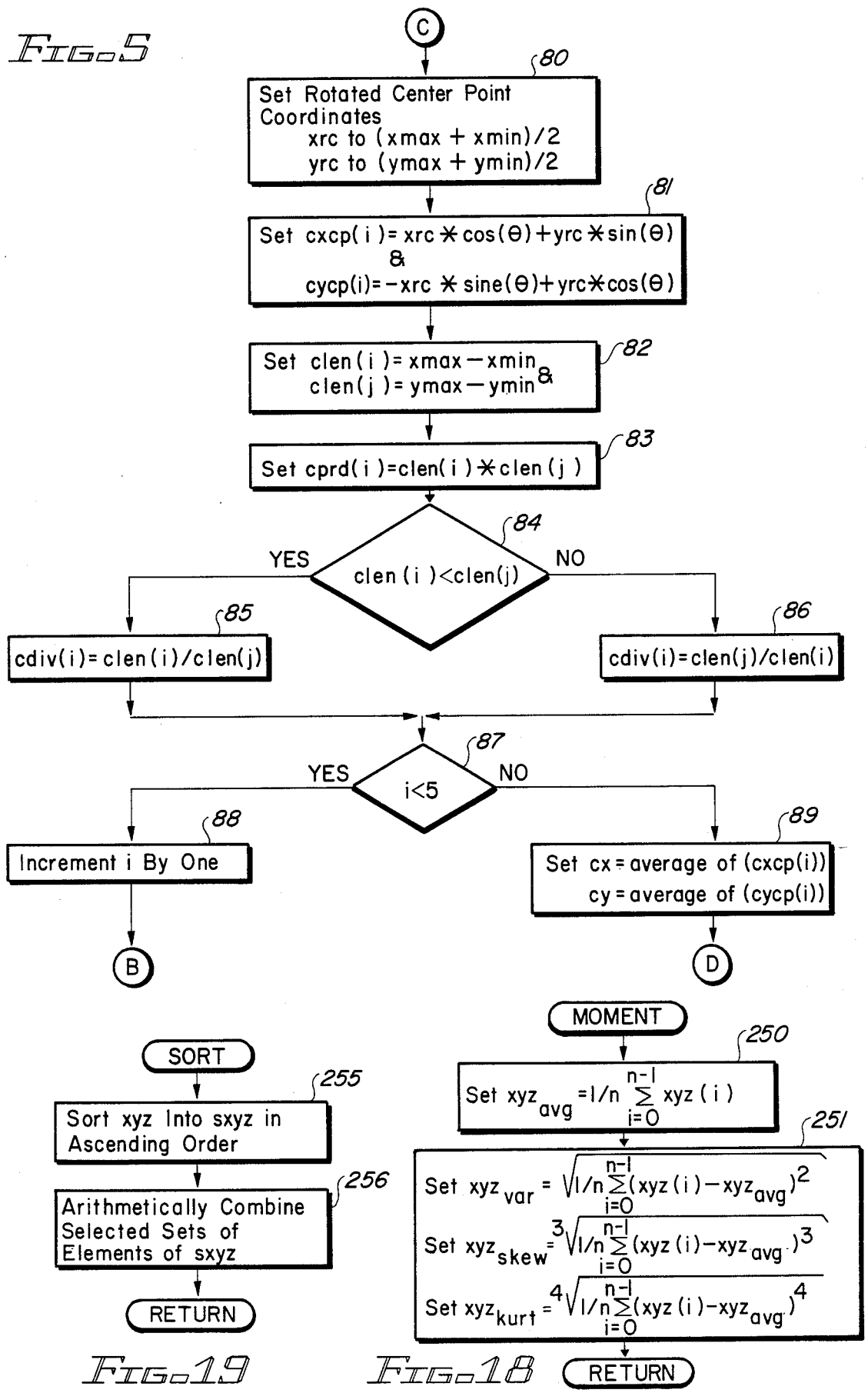

Next, the individual subroutines will be described. Referring to FIG. 3, the DOCON subroutine produces various characteristics of six hypothetical minimum bounding rectangles of the character, each rotated 15 degrees relative to the prior one. The minimum bounding rectangles, as typified by 32-0 and 32-1 shown in FIG. 2A, are not actually "drawn", but visualizing them can be helpful in understanding the resulting computed variables. The DOCON subroutine comprises FIGS. 3–6. Basically, the purpose of FIG. 3 is to find all the perimeter pixels of a character such as 25 of FIG. 2A that are likely candidates for the set of four touching perimeter points of any minimum bounding rectangle, by eliminating from consideration any linear and concave perimeter points. The purpose of FIG. 4 is to find the set of four touching perimeter points of each minimum bounding rectangle, and the purpose of FIG. 5 is to find the center point, height, width, area, and aspect ratio of each minimum bounding rectangle, as well as the average center point. Finally, FIG. 6 computes the distances between each pair of center points of the minimum bounding rectangles and the length of the perimeter of the polygon formed by the center points.

The DOCON subroutine starts at block 50 and initializes a previous direction variable pd to the value PD(nperim−1) which is the direction from the pixel previous to the upper leftmost pixel of the character. For example, in FIG. 2A, numeral 23A is the upper leftmost pixel of the character, and point 23B is the location of the previous (nperim−1)th pixel.

The subroutine then goes to block 51 and initializes the perimeter index ip to 0 and also sets an index c of a cpi array to 0. The cpi array is referred to as the convex pixel index array. The subroutine then goes to block 52 and sets a current direction variable cd to PD(ip).

It should be appreciated that the perimeter pixel arrays PX(ip) and PY(ip) contain all of the perimeter x and y coordinates. FIG. 3 provides a way of filling a new array, whererin the convex pixel index array or cpi(c) array can be used instead of ip as the index of PX and PY perimeter pixel arrays in order to point to pixels which are suitable candidates for touching any minimum bounding rectangle.

The subroutine of FIG. 3 goes from block 52 to decision block 53 and determines if (cd−pd) is less than or equal to −4. If this determination is affirmative, it means that the perimeter of the character has been tracked through a sufficient cumulative angle to pass through direction 0 one or more times, making it necessary to increment the current direction cd by 8 as shown in block 54 to maintain concavity. If the determination of block 53 is negative, the subroutine goes to decision block 55 and determines if the current direction (cd−pd) is greater than 4. If this determination is affirmative, it means that the perimeter of the character has been tracked through a sufficient cumulative positive angle to pass through direction 0 one or more times, making it necessary to decrement the current direction cd by 8 as shown in block 56 to maintain convexity. If the determination of block 55 is negative, the program goes to decision block 57 to determine if the current direction cd is greater than the previous direction pd. If this determination is affirmative, it means that the present portion of the perimeter is convex, rather than being linear or concave, as would be indicated by a negative determination of block 57. If the present portion of the perimeter is convex, the convex pixel index array is set to ip, the number of the current perimeter pixel in block 58. The cpi index c is incremented by 1 in block 59.

The subroutine then goes to decision block 60 and determines if the present pixel is the last perimeter pixel of the character. This corresponds to a negative determination of decision block 60. If the loop is not completed, the subroutine goes from block 60 to block 61 and sets the previous direction pd to the current direction cd, then goes to block 62 and increments the pixel index ip by 1, and returns to block 52, and continues. In block 63, the subroutine sets a convex pixel count cpnum to c, and goes to the subroutine of FIG. 4 via label A.

In FIG. 4, the first step is to initialize a rotation index i to 0, as indicated in block 70. The rotation index keeps track of the six different rotations of the six minimum bounding rectangles mentioned above, or as implemented, to keep track of the six 15 degree rotations of the perimeter of character 25 and the resulting sets of minimum bounding rectangle measurements. In block 71, the subroutine initializes the x and y coordinate minima xmin and ymin to a very positive value and initializes the x and y coordinate maxima xmax and ymax to a very negative value. The subroutine then goes to block 172 and sets a 90 degree rotation index j to i+6, and sets an angle $\theta$ to $(i*\pi/2)/6$, where $\pi=3.14$ and * is used to designate multiplication.

The subroutine then goes to block 73 and reinitializes the cpi index c to 0, goes to block 73A and sets the current x coordinate to x=PX(cpi(c)) and sets the current y coordinate to y=PY(cpi(c)), and then goes to block 74.

The purpose of providing two rotation indexes i and j is so that for every rotation, two minimum bounding rectangle lengths, i.e., a minimum bounding rectangle vertical length or height and a minimum bounding rectangle angle horizontal length or width will be stored in clen(i) and clen(j) elements, respectively of the length array. (Also see block 82 infra).

In block 72, rotation index i is incremented, and $\theta$ also is incremented by 15 degrees.

Blocks 73A, 74, 75, 76, and 77 form a loop which examines every candidate convex point on the perimeter of the character after incrementing $\theta$, in order to determine the minimum and maximum values of the rotated x coordinate and the rotated y coordinate. In block 74, the subroutine sets the rotated x coordinate xr to $$xr = x*\cos(\theta) - y*\sin(\theta)$$

and sets the rotated y coordinate yr to $$yr = x*\sin(\theta) + y*\cos(\theta).$$

The two foregoing equations serve to effectively rotate the point x,y counter-clockwise around the origin 0,0 to point xr,yr.

Then the subroutine goes to block 75 and determines the extrema of the rotated object by setting xmin to the smaller of xr and the previous value of xmin, sets ymin to the smaller of yr and the previous value of ymin, sets xmax to the larger of xr and the previous value of xmax, and sets ymax equal to the larger of yr and the previous value of ymax. The program then goes to block 76 determines if the convex pixel index array index c is less than the convex pixel count, cpnum−1. If this determination is affirmative, then there are more candidate convex perimeter pixels, so the subroutine goes to block 77, increments c by 1 and returns to block 73A. Otherwise, the subroutine goes via label C to FIG. 5.

In block 80 of FIG. 5, the subroutine sets a rotated center point coordinate xrc to (xmax+xmin)/2 and a rotated center point coordinate yrc to (ymax+ymin)/2. The subroutine then goes to block 81 and sets cxcp(i), the x coordinate of the center point of the minimum bounding rectangle for rotation i, to $$xrc*\cos(\theta) + yrc*\sin(\theta),$$

and sets cycp(i), the y coordinate of the center point of the present minimum bounding rectangle to $$-xrc*\sin(\theta) + yrc*\cosin(\theta).$$

The two foregoing equations serve to effectively rotate the point xrc,yrc clockwise about the origin 0,0 to the point cxcp(i), cycp(i).

The subroutine then goes to block 82 and sets width clen(i) to (xmax−xmin) and sets height clen(j) to (ymax−ymin). The subroutine then, in block 83 sets cprd(i) to clen(i)*clen(j).

The subroutine then goes to block 84 and determines if the width clen(i) is less than the height clen(j) for the present minimum bounding rectangle. If this determination is affirmative, the subroutine goes to block 85 and computes an aspect ratio cdiv(i) equal to the ratio of clen(i)/clen(j). Otherwise, the subroutine goes to block 86 and sets the aspect ratio cdiv(i) to the opposite ratio clen(j)/clen(i) so that the aspect ratio will always be less than or equal to 1.

In either case, the subroutine goes to block 87 to determine if the rotation index i is less than 5. If it is, the program goes to block 86, increments i, and returns via label B to block 71 of FIG. 4 to repeat the foregoing process for another 15 degree rotation. Otherwise, the subroutine goes to block 89 and sets cx to the average of the six cxcp(i) and sets cy equal to the average of the six cycp(i). The subroutine then goes via label D to FIG. 6.

Figure 6:
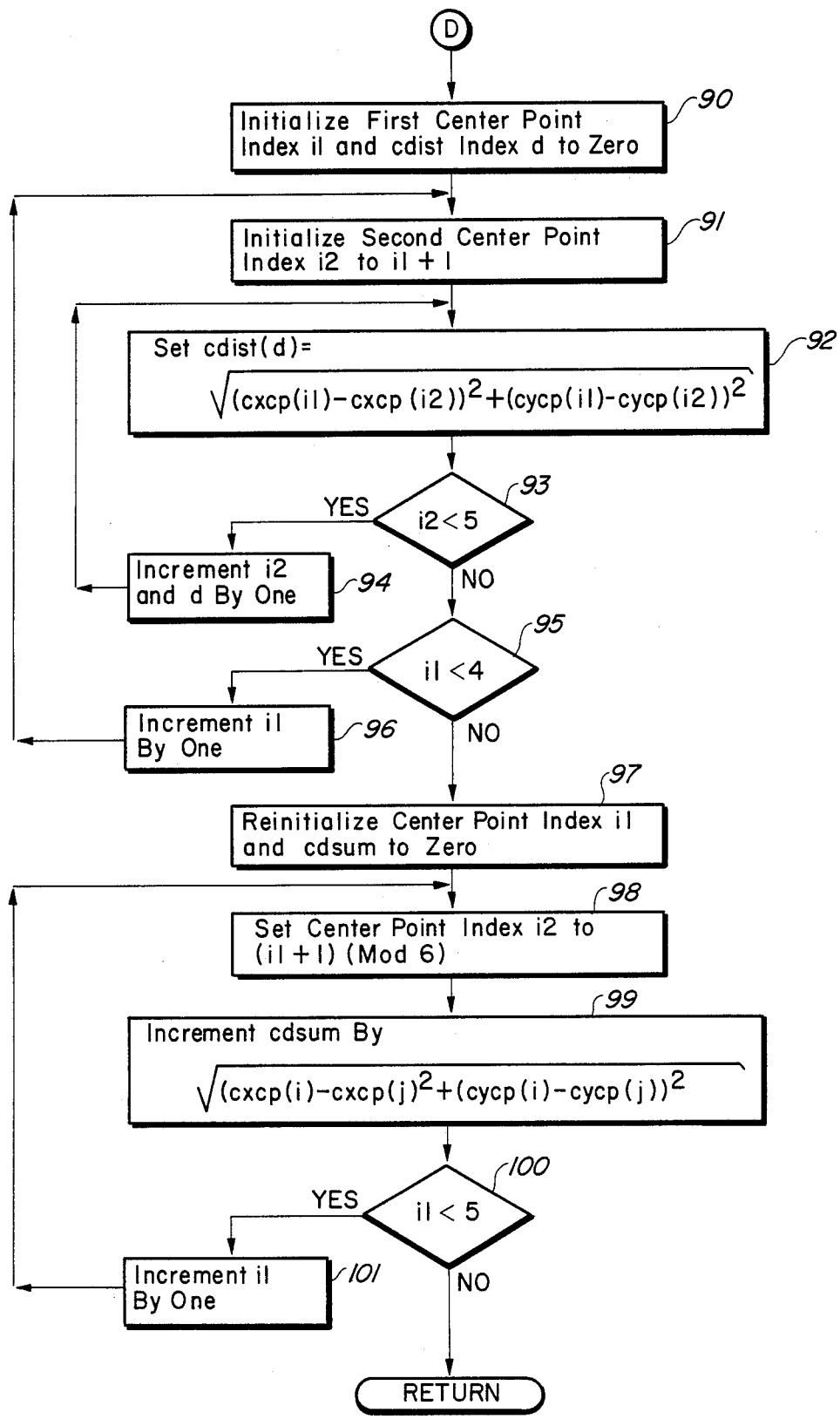

At this point, the subroutine has completed rotating character 25 to produce six minimum bounding rectangles. The variables pertaining to the six resulting center points are computed next. The first step, in block 90, of FIG. 6 is to initialize a first center point index i1 to 0 and to initialize a cdist index d to 0. The cdist index d takes on 15 values from 0 to 14, which is the number of lines that can be drawn between all pairs of the six center points of the rotated minimum bounding rectangles. Next, the subroutine goes to block 91 and initializes a second center point index i2 to i1+1. The subroutine then goes to block 92 and sets cdist(d) to $$\sqrt{(cxcp(i1)-cxcp(i2))^2+(cycp(i1)-cycp(i2))^2}.$$

The subroutine then goes to block 93 and determines if the second center point index i2 is less than 5, and if it is, it increments i2 and d, and returns to block 92 and sets a new value for cdist(d). When a negative determination is obtained from block 3, the subroutine goes to block 94 and determines if the first center point index i1 is less than 4, and if it is, increments i1 and returns to block 91. When a negative determination is obtained from block 95, the subroutine goes to block 97. In effect, the two loops fed by decision block 93 and 94 serve to measure distances from the first center point cx,cy to second, third, fourth and fifth center points, and then measure the distances from the second center point to the third, fourth, and fifth points, etc., until distances between all possible pairs of the six center points have been measured to thereby produce the 15 values of cdist(0-14).

In block 97, the subroutine reinitializes the first center point index i1 to 0 and also initializes the variable cdsum to 0. The subroutine then goes to block 98 and sets the second center point index i2 to (i1+1) (mod6). The subroutine then goes to block 99 and increments cdsum, the sum of all of the distances between adjacent bounding rectangle center points by the amount $$cdsum=\sqrt{(cxcp(i)-cxcp(j))^2+(cycp(i)-cycp(j))^2}$$

and then goes to block 100 and determines if i1 is less than 5. If it is, the subroutine increments i1 and returns to block 98, and otherwise returns.

Referring next to FIG. 7, the DOPERIM subroutine operates on the same perimeter information as DOCON, namely nperim, perim, the PX(ip), PY(ip), and PD(ip) arrays, as well as cx,cy, previously computed by DOCON. In block 105 the previous direction variable pd is initialized to 0 and the start direction variable sd is initialized to PD(0) (pd and sd are only used in generating the ptan(ip) array). The subroutine then goes to block 106 and initializes the perimeter index ip to 0, and then goes to block 107 and sets xproj(ip) to PX(ip) and sets yproj(ip) to PY(ip). (The reason for the foregoing steps is to allow conversion from integer to floating point representation). Then, in block 108 the DOPERIM subroutine computes the length of the radius from the center cx,cy and sets prad(ip) equal to that radius, i.e., to $$prad(ip)=\sqrt{(PX(ip)-cx)^2+(PY(ip)-cy)^2}.$$

The subroutine then goes to decision block 109 and determines if the direction PD(ip) is even or odd. If it is even, the subroutine goes to block 110, and sets plen(ip) to 1, since the present direction is either horizontal or vertical. If the present direction is not even, then the present direction is diagonal, and the subroutine sets plen(ip) equal to the square root of 2. In either case, the subroutine goes to block 112 and sets the current direction variable cd to $$cd=PD(ip)=Sd,$$

so that the first direction is always 0 and the bias or start direction is subtracted from subsequent directions.

The subroutine then goes to block 113. Blocks 113–116 of FIG. 7 accomplish exactly the same thing as blocks 53–56 of FIG. 3. In block 117 the subroutine sets ptan(ip) to the current direction cd, and sets the previous direction pd to the present value of cd, and then goes to decision block 118, which determines if the foregoing procedure has been performed for all of the perimeter points up to the nperim−1 perimeter point. If this determination is negative, that is, if further perimeter points remain, the subroutine goes to block 119, increments the perimeter index ip by 1, and returns to block 107. Otherwise the subroutine computes prmax to be the maximum of the radius lengths in prad(ip) and returns.

Figure 8:
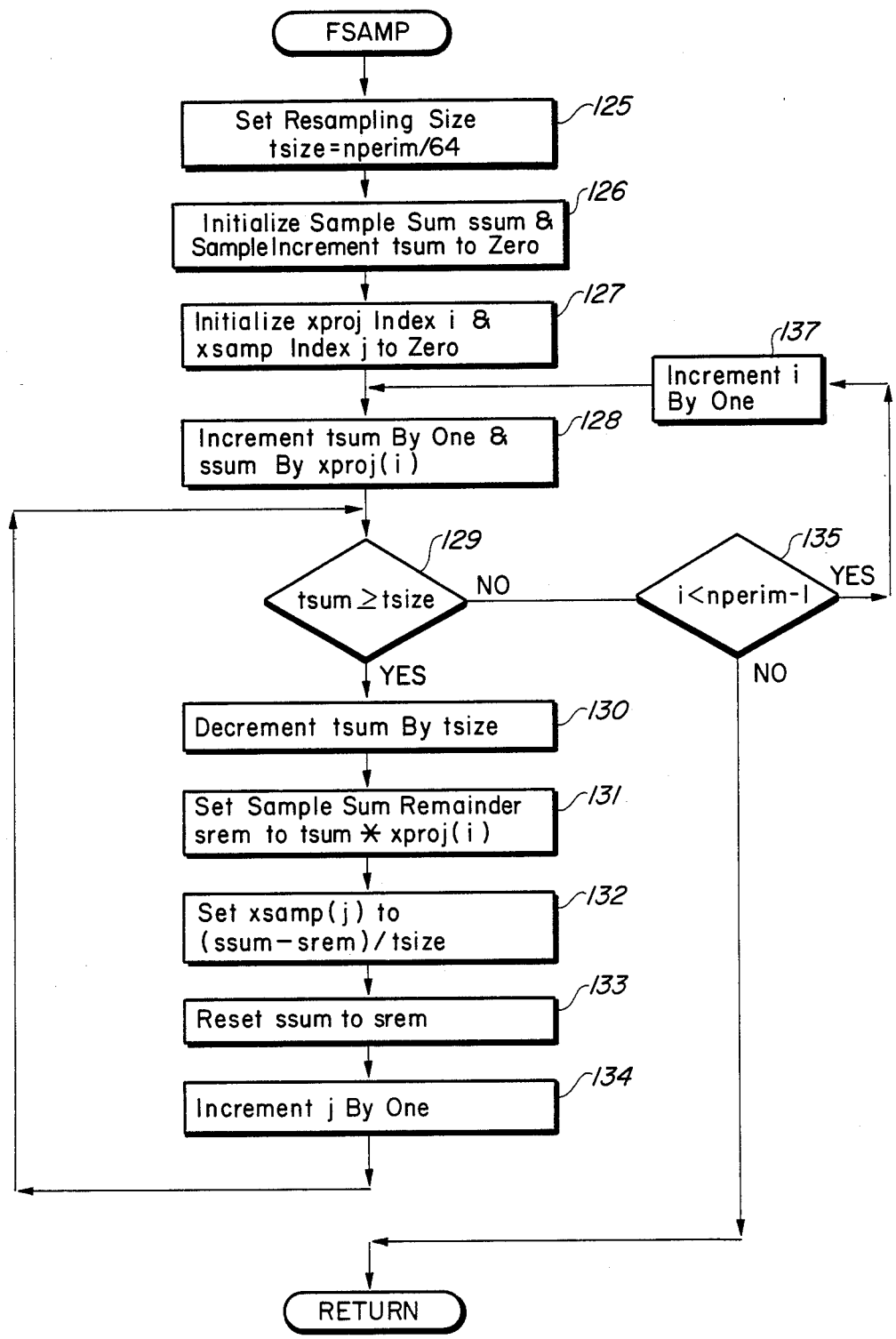
FIG. 8 is a flow chart of the FSAMP subroutine of FIG. 1.

Next, the feature extraction routine goes to the FSAMP subroutine of FIG. 8. The FSAMP subroutine operates upon arrays of nperim elements, which is the number of perimeter pixels of the character 25. The FSAMP subroutine "resamples" these arrays to represent them by 64 points, which has found to be adequate for good accuracy. This reduction in the number of perimeter points to a constant, small number greatly reduces the computational time required to obtain Fourier coefficients, moments, etc, and allows convenient accessing of stored cosine and sine tables to compute the Fourier transform. It should be noted that the same FSAMP subroutine is executed to operate on xproj(ip) and yproj(ip), although in FIG. 8 it is shown only using the xproj and xsamp variables. If the FSAMP subroutine operates on yproj, then the variable ysamp is used.) First, the subroutine goes to block 125 and sets a resampling size variable tsize equal to nperim/64. Note that there are nperim perimeter pixel points, and it is desired to convert these to 64 resampled points, so it is necessary to define the sampling size as equal to nperim divided by 64.

Next the subroutine goes to block 126 and initializes a sample sum ssum and also initializes a sample increment tsum to 0. The sample increment tsum is used to count samples having the sample size tsize, and ssum represents the sum of those values.

Next the subroutine goes to block 127 and initializes the xproj index i and the xsamp index j to 0. The xproj index i counts through the nperim perimeter points and the xsamp index j counts through the 64 resampled points.

The subroutine then goes to block 128 and increments tsum by 1 and increments ssum by xproj(i).

Next the subroutine goes to decision block 129 and determines if tsum is greater than or equal to tsize. If this determination is affirmative, it means that i has crossed a boundary needed to form another xsamp sample. The subroutine therefore decrements tsum by tsize, in block 130, goes to block 131 and sets sample sum remainder srem to tsum times xproj(i). The subroutine then goes to block 132 and sets xsamp(j) to (ssum−− srem)/tsize, increments j by 1 in block 134 and returns to decision block 129. If the determination of decision block 129 is negative, the subroutine goes to decision block 135 and determines if the xproj index i is less than nperim−1. If this determination is negative, it means that all nperim perimeter points have been resampled, and the subroutine returns to the calling program. If the determination of block 135 is affirmative, the subroutine determines that more resampling is required, increments the xproj index i by 1, and returns to block 128.

(It should be noted that if the yproj array is being operated on by FSAMP, then xproj is replaced by yproj in block 127 and xsamp is replaced by ysamp in block 127. xproj is replaced by yproj in block 131, and xsamp is replaced by ysamp in block 132.)

Perhaps the operation of the FSAMP subroutine can be further understood with reference to FIG. 8A, in which reference numeral 139 represents the xproj(i) array, plotted versus the xproj index i. If the distance between vertical line 139B and vertical ordinate 139C is tsize, xsamp(1) is the area under the curve between tsize line 139B and the zero ordinate 139C. This is the quantity computed in block 132 of FIG. 8. This value is represented by the horizontal line 139D, which represents a single resampled one of the permitted 64 points corresponding to nperim/64 perimeter pixels. If it is determined in block 129 that tsum is greater than tsize, the remainder srem is represented by the area under the curve 139 between vertical lines 139A and 139B, vertical line 139A representing tsum in this case. The amount srem is included in the xsamp(2) value computed in block 132 on the next pass and indicated by the level 139F, which extends to vertical line 139E, which is equal to 2 times tsize.

The above subroutine accurately "shrinks" the nperim perimeter pixels to a more manageable sample size of 64 if nperim exceeds 64, and "extends" the nperim pixels to produce 64 samples if nperim is less than 64.

Figure 9:
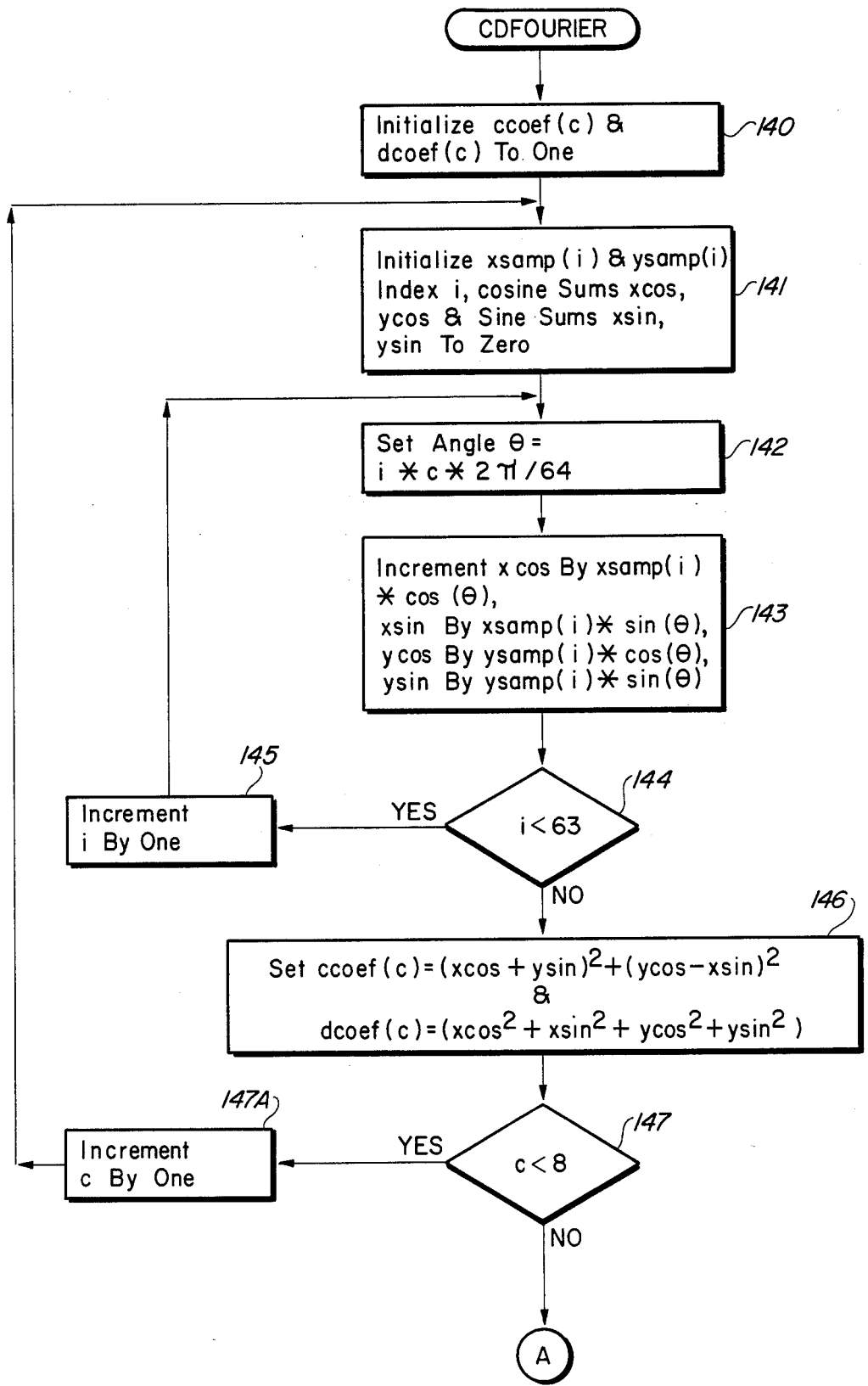
FIGS. 9 and 10 constitute a flow chart of the CDFOURIER subroutine of FIG. 1.

As indicated in FIG. 1, the xsamp and ysamp arrays together are operated upon by the dual complex Fourier transform subroutine of FIG. 9, which computes two sets of eight harmonic coefficients of the xsamp and ysamp arrays. The CDFOURIER subroutine of FIGS. 9 and 10 goes first to block 140 and initializes the index c, which is the index for the ccoef variable and the dcoef variable, to 1. The subroutine then goes to block 141 and initializes the xsamp and ysamp index i, the cosine sums xcos and ycos, and the sine sums xsin and ysin to 0. The subroutine then goes to block 142, which sets an angle $\theta$ to $i*c*2/64$, since 64 points represent the traversing of the perimeter of the character from the first pixel to the nperim−1 pixel, or one cycle.

Next the subroutine goes to block 143 and increments xcos by xsamp(i)*cos ($\theta$), increments xsin by xsamp(i)*sin ($\theta$), increments ycos by ysamp(i)*cos ($\theta$), and increments ysin by ysamp(i)*sin ($\theta$).

The subroutine then goes to decision block 144 and determines if the xsamp and ysamp index i is less than 63, and if this determination is affirmative, the inner loop of the subroutine is unfinished, so i is incremented by 1 and the subroutine returns to block 142. If the determination of decision block 144 is negative, the inner loop of the subroutine is finished, and the subroutine goes to block 146 and sets ccoef(c) to $$\text{ccoef}(c) = (x\cos + y\sin)^2 + (y\cos - x\sin)^2,$$

and dcoef(c) to $$\text{dcoef}(c) = x\cos^2 + x\sin^2 + y\cos^2 + y\sin^2.$$

The subroutine then goes to block 147 and determines if the ccoef and dcoef index c is less than 8, and if it is, increments c by 1 and returns to block 141. If c is not less than 8, the subroutine goes to block 148 of FIG. 10.

The coefficients ccoef(1–8) and dcoef(1–8) computed above are "raw" coefficients in that they are dependent upon the size of the character. This is unsatisfactory because the size dependence makes it impossible to distinguish a relatively high amplitude harmonic of a small character from a relatively low amplitude harmonic of a large character, because both will have the same magnitude. In the prior art, the approach to normalizing the harmonic coefficients has been to divide the coefficients by the magnitude of the first harmonic or by the sum of the magnitudes of all of the harmonics. The former approach, normalizing with the amplitude of the first harmonic only, has the disadvantage that the first harmonic itself is a useful feature, and generally it is undesirable to scale or normalize with a useful feature because informational content of that feature is lost.

The main disadvantage of the latter approach is that the higher numbered Fourier coefficients will be abnormally high if the character is very noisy.

Figure 10:
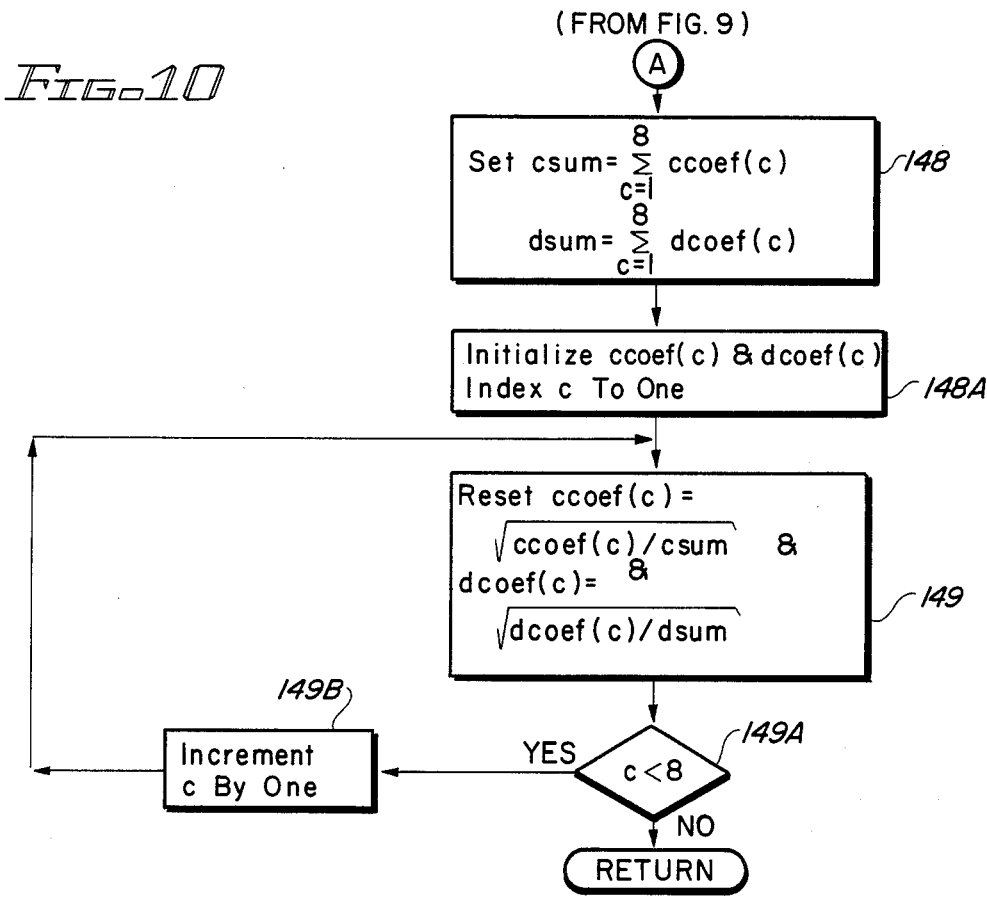

Continuing with FIG. 10, the variables csum and dsum are set equal to the sums of the respective sets of eight raw coefficients in block 148, and the ccoef and dcoef index c is initialized to 1. Next, block 149 sets ccoef(c) to $$\text{ccoef}(c) = \sqrt{\text{ccoef}(c)/\text{csum}}$$

and dcoef(c) to $$\text{dcoef}(c) = \sqrt{\text{dcoef}(c)/\text{dsum}}.$$

Thus, the approach is to normalize each of the magnitude-squared raw coefficients by the sum of the set of eight harmonic coefficients to which it belongs and then take the square root.

Figure 11:
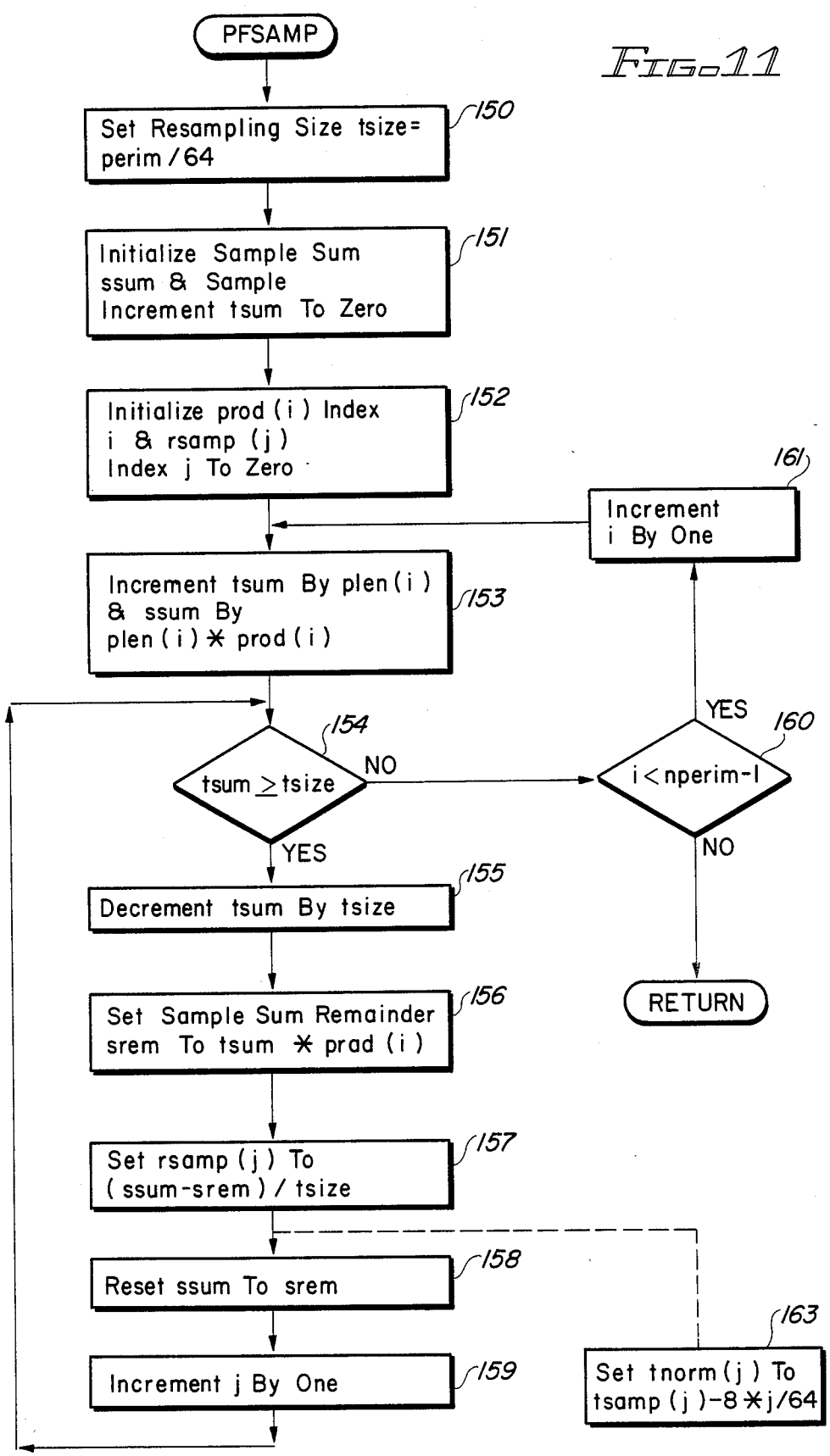
FIG. 11 is a flow chart of the PFSAMP subroutine of FIG. 1.

The PFSAMP parametric resampling subroutine of FIG. 11 is similar to the FSAMP subroutine of FIG. 8, except that the former operates on the prad(ip) and ptan(ip) subroutines using plen(ip), the elements of which are not equally spaced, as is the case for the xproj(ip) and yproj(ip) arrays. In FIG. 11, blocks 150 and 151 are identical to blocks 125 and 126, respectively, of FIG. 8. Block 152 is similar to block 127, except that in the former, i is the prad index and j is the rsamp index. In block 153 of FIG. 11, tsum is parametrically incremented by the length plen(i) and ssum is incremented by the area plen(i)*prad(i). Blocks 154, 155, 158, 159, 160, 161, and 162 of FIG. 11 are identical to blocks 129, 130, 133, 134, 135, 137, and 136 of FIG. 8, respectively. In block 156, srem is set to the area tsum*prad(i), and in block 157 rsamp(j) is computed to (ssum−srem)/tsize.

Figure 11A:
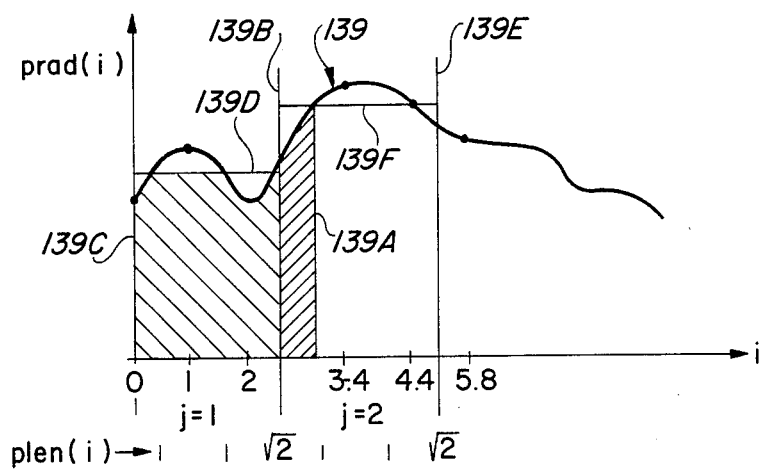
FIG. 11A is a diagram useful in understanding the operation of the flow chart of FIG. 11.

FIG. 11A is the same as FIG. 8A, except that the prad(i) samples are unevenly spaced in accordance with plen(i). If the PFSAMP subroutine of FIG. 11 operates on ptan(ip) instead of prad(ip), then prad and rsamp(ip) in block 152 are replaced by ptan(ip) and tsamp, respectively. Tsamp is, in essence, an array of scaled perimeter tangent angles. Furthermore, if PFSAMP operates on ptan(ip), block 163 is inserted between blocks 157 and 158, indicating that tnorm(j) is set to tsamp(j)−8*j/64.

Figure 11B:
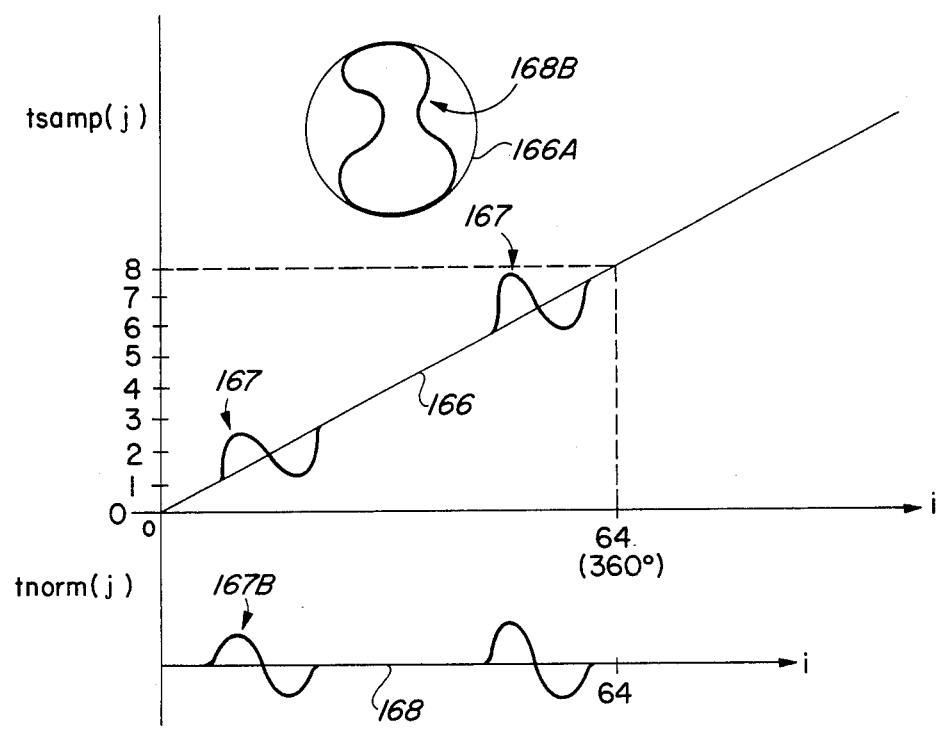
FIG. 11B is a diagram also useful in understanding the operation of the flow chart of FIG. 11.

Block 163 is added in order to correct tsamp by removing increments of "circularity". To understand what this means, refer to FIG. 11B, in which tsamp is plotted against j. The diagonal line 166 represents tsamp if the character represented is a circle 166A. The curve 167 is a plot of tsamp if the character is the "figure 8" shape 168B. The function tsamp(j) is not periodic, i.e., it does not return to 0, so a Fourier transform of tsamp(j) is not possible. However, if the diagonal line 166 is subtracted, i.e., the increment of "circularity" is removed by subtracting the quantity j*8/64, to produce tnorm(ip), then a meaningful Fourier transform of tnorm(0-63) can be computed as indicated in FIG. 1.

FIG. 12 shows a subroutine DERIV that performs a smoothing, derivative operation on the tsamp(0-63) array to produce the tdiff(0-63) array, which represents increments in the resampled direction codes as differences between successive smoothed points of the tsamp array. As subsequently described, this information is useful in evaluating the convex and concave portions of the character from which features are being extracted. This is useful because the English alphanumeric character set is partially discernible by analysis of the magnitudes of a character's convexities and concavities.

In FIG. 12, the first step is to initialize the smoothing sum variable ssum to the sum of the first eight tsamp array elements, as indicated in block 190. In block 191, the subroutine initializes a low smooth index j to 0 and initializes a high smooth index k to 7. This in effect establishes an eight element "moving window" from which a moving average is computed. The subroutine then goes to block 192 and sets tdiff(j) to ssum/8. The subroutine then goes to block 193 and decrements ssum by tsamp(j), to thereby remove that term from the window.

The subroutine then goes to block 194 and determines if the high smooth index k is less than 64, and if it is, goes to block 195 and increments ssum by tsamp(k) to thereby add that term to the window. If k is not less than 64, the subroutine goes to block 195A and instead increments ssum by tsamp(k−64)+8, in order to "wrap around". Next, the subroutine goes to decision block 196 and determines if the low smooth index j is less than 63. If it is, the subroutine goes to block 197, increments j, returns to block 192 and computes a new value of tdiff(j), i.e., a new value of the moving average tdiff(j). If the determination of block 196 is that the smoothing loop is finished, and the subroutine goes to block 198 and initializes a tdiff index i to 1, and enters another loop at block 199 and resets tdiff(i) to (tdiff(i+1)−tdiff(i)), thereby computing the direction code increment. The subroutine then goes to decision block 200 and determines if the tdiff index i is less than 62, and if it is, increments i and returns to block 199. When the first 63 points of the tdiff(i) array have been computed, the subroutine obtains a negative determination from block 200, goes to block 202, and computes the value of the final point of the tdiff(i) array, namely point tdiff(63) to (8+tdiff(0)−tdiff(63)), in order to wrap around. tdiff is, in essence, an array of perimeter tangent angle increments. The subroutine then returns.

Figure 13:
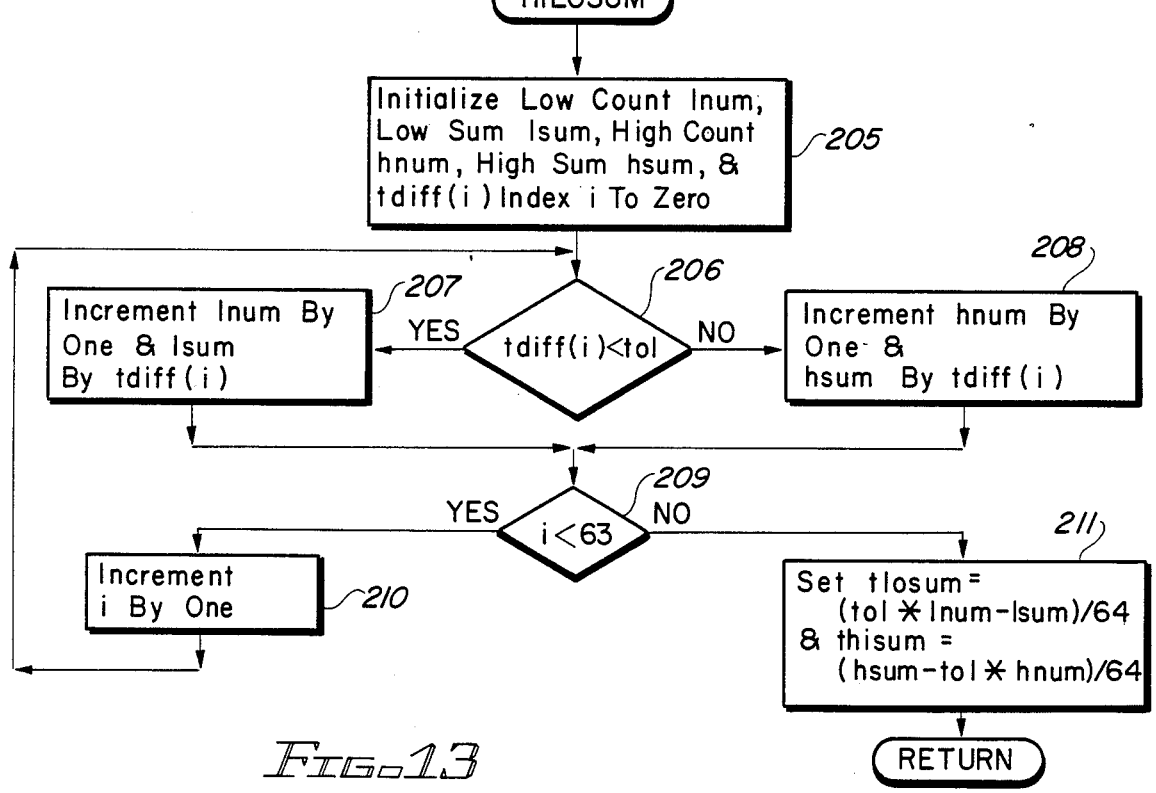
FIG. 13 is a flow chart of the HILOSUM subroutine of FIG. 1.

Next, the HILOSUM subroutine of FIG. 13, which analyzes the concavities of the character from which features are being extracted, is described. The subroutine operates on the tdiff(i) array that contains the smoothed differences of the perimeter direction codes from the tsamp array. Understanding of the HILOSUM subroutine of FIG. 13 can be aided by referring to FIG. 14, in which tdiff(i) is plotted for a "figure 8" character 25. Waveform 213 represents tdiff(0-63). Two values of the variable tol, a tolerance or threshold, namely tdiff equal to −1 and +1 also are shown. Points A, B, C, D, E, and F are identified on curve 213 to identify convexities A, C, D, and E and concavities B and F of the character. The convexities appear as peaks and the concavities appear as valleys in the tdiff curve. As can be seen from curve 213 in FIG. 14, areas 214E above the higher tol value of +1 represent prominent convexities, whereas areas 214D below the lower tol value of −1 represent prominent concavities.

Multiple values of tol can be empirically selected to produce a desired level of information about the concavities and convexities of the character from which features are being extracted.

The HILOSUM subroutine of FIG. 13 first goes to block 205 and initializes a low count variable lnum, a low sum variable lsum, a high count variable hnum, a high sum variable hsum and a tdiff index i, all to 0. The subroutine then goes to decision block 206 and determines if the current value of tdiff(i) is less than tol. If the determination of block 206 is affirmative, the subroutine goes to block 207 and increments lnum by 1 and lsum by tdiff(i), and goes to decision block 209. If the determination of block 206 is negative, the subroutine goes to block 208, increments hnum by 1, increments hsum by tdiff(i), and goes to decision block 209. Block 209 determines if i is less than 63, and if it is, the subroutine goes to block 210 and increments i by 1 and returns to block 206. Otherwise the subroutine goes to block 211 and sets tlosum to tlosum=(tol*lnum−lsum)/64, and thisum to thisum=(hsum−tol*hnum)/64, and returns. In essence, the scaled sum of the convex areas such as 214E in FIG. 14 are represented by this sum and the scaled sum of the areas 214D representing concavities are represented by tlosum.

Next, the DORAD subroutine of FIG. 15, which forms rings and slices as previously described with reference to FIG. 2C, shows how character pixels are added into the rings and slices. In block 216 the subroutine sets a ring scale factor variable rsize to 7.99 . . . /prmax, thereby scaling any radii to a truncated integer between 0 and 7. The subroutine then goes to block 217 and sets a slice scale factor variable ssize to 23.99 . . . /$2\pi$, in order to scale all angles to a truncated integer between 0 and 23.

In block 218, the subroutine initializes all of the ring-(0-7) array to 0 and also initializes all of the slice(0-23) array to 0.

In block 219 the subroutine initializes y to 0, goes to block 220 and initializes x to 0.

The initialized ring and slice variables now can be thought of as mathematical integrals into which dark pixels overlayed by the ring or slice are summed as the DORAD subroutine is executed.

The subroutine then goes to decision block 221 and determines if P(x,y) is equal to 1, i.e., whether the present pixel is dark. If this determination is affirmative, the subroutine goes to block 222 and translates the x and y coordinates with reference to the center point cx,cy designated by reference numeral 26 in FIG. 2A, by setting x equal to x−cx and setting y equal to y−cy.

The subroutine then goes to block 223 and sets the ring index r equal to rsize times the square root of $(x^2+y^2)$, thereby setting the ring index to the distance between the particular character pixel and the character center, and multiplies by rsize to truncate r to an integer between 0 and 7. The subroutine then goes to block 224 and sets the slice index s equal to the arctangent of (−y/x), thereby setting the slice index to the angle formed by the particular character pixel and the positive x axis drawn through the character center and multiplies by ssize to truncate s to an integer between 0 and 23. The subroutine then goes to block 225 and increments ring(r) and slice(s) and goes to decision block 226, and if x is less than mx, the width of the minimum bounding rectangle at rotation 0, the subroutine increments x and returns to decision block 221. If the determination of block 226 is negative, the subroutine goes to decision block 228 and determines if y is less than my, the height of the minimum bounding rectangle at rotation 0. If this determination is affirmative, the subroutine increments y and returns to block 220, and otherwise goes to block 230 and scales ring(0-7) and slice(0-23) by dividing them by npix to make these variables between 0 and 1 and size-invariant. Thus, the character array P(x,y) is scanned, line-by-line, and dark pixels are added to or included in appropriate ones of the eight defined rings and the appropriate ones of the 24 defined slices. Each of the eight rings and 24 slices then contains a certain fraction of the total dark pixels in the character.

As previously mentioned with reference to FIG. 1, the slice(0-23) array is not rotation-invariant, so the RFOURIER subroutine of FIG. 16, the CORREL subroutine of FIG. 17, the MOMENT subroutine of FIG. 18, and the SORT subroutine of FIG. 19 operate on the slice(0-23) array to produce size invariant and rotation invariant features.

It should be noted that at this point in the execution of the feature extraction program, all of the computed variable arrays have been produced. As previously indicated, the RFOURIER subroutine of FIG. 16 and the CORREL subroutine of FIG. 17, and/or the MOMENT subroutine of FIG. 18 and the SORT subroutine of FIG. 19 have been utilized to compute additional features in the cases where the computed variables arrays as shown in FIG. 1 are followed by a * or +, respectively. In FIGS. 16-19, "xyz" designates any one of these arrays of n elements xyz(0), ... xyz(n−1). All of the features produced by these subroutines of FIGS. 16, 17, 18, and 19, are, of course rotation invariant. Features produced by RFOURIER and CORREL are size invariant due to normalization performed within those subroutines. Size invariance for the variables computed by MOMENT and SORT is achieved by dividing by an appropriate scale factor as discussed hereinafter.

Next, the real Fourier transform subroutine RFOURIER of FIG. 16 will be described. It is quite similar to the complex Fourier transform subroutine of FIGS. 9 and 10 except it operates on a single array xyz, one of clen, cprd, cdiv, rsamp, tnorm, and slice, instead of xsamp and ysamp, and produces a single coef array, one of clcoef(1-4), cpcoef(1-2), cdcoef(1-2), rcoef(1-8), tcoef(1-8) and scoef(1-6), respectively, instead of ccoef and dcoef. The technique of subroutine 16 for Fourier transformation is well-known in the art, and is included here only for completeness. Block 170 of FIG. 16 is similar to block 140, except c is the index of coef. Block 171 is the same as block 141, except that i is the xyz index, and the cosine and sine sums are rcos and rsin instead of xcos, ycos, xsin and ysin. Block 172 of FIG. 16 is identical to block 142 of FIG. 9. The computations shown in block 173 consists of half of the computations shown in block 143. The computation in block 176 is simpler than the two computations shown in block 146. Finally, the normalization shown in blocks 180-184 of FIG. 16 using rsum are the same computation as the two normalizations shown in blocks 148-149B of FIG. 10 using csum and dsum.

Next, the autocorrelation subroutine of FIG. 17 will be described. The technique of subroutine 17 for autocorrelation is well-known in the art, and is included here only for completeness. Referring to FIG. 17, the subroutine CORREL first initializes all possible correlations acor(0−(n−1)) to 0. The subroutine then goes to clock 236 and initializes a correlation index c to 0, and enters an outer loop at block 237 by initializing the xyz index i to 0. The subroutine then enters an inner loop at block 238 and sets a shifted xyz index j to (i+c)modn. The subroutine then goes to block 239 and increments acor(c) by xyz(i)*xyz(j). If this loop is unfinished, as is the case if i is less n−1 as determined by decision block 240, the subroutine goes to block 241 and increments i, and returns to block 238 to continue the inner loop, which continues to compute the correlation variable acor(c). When the loop is completed, the subroutine goes to decision block 242 and determines if the correlation index c is less than n−1, and if it is, goes to block 243, increments c, and returns to block 237 to continue the outer loop. When the outer loop is complete, the subroutine goes to block 244 and normalizes the computed values of the array acor(1−(n−1)) by dividing each element by the value of acor(0), the non-shifted autocorrelation, or sum of the squares of the xyz array, and returns.

At this stage, coef(1-8) are raw coefficients, as are ccoef(1-8) and dcoef(1-8) after block 147 in FIG. 9. The elements of coef(1-8) are scaled by blocks 180 through 184 of FIG. 16 in the same way as ccoef(1-8) and dcoef(1-8) are scaled by blocks 148 through 149B in FIG. 10.

The one-dimensional moment subroutine MOMENT of FIG. 18 simply computes moments in accordance with well-known art, and also is included here only for completeness. In FIG. 18, the average of the array is computed in block 250 by dividing all of the elements in the array by the number of the elements in the array. In block 251 the variance, skew, and kurtosis are computed using conventional well-known formulas. In FIG. 19, the single block 246 indicates that the array is sorted into elements in ascending order (or any other predetermined order that may be useful). One skilled in the art can easily provide a routine to sort an array. In principle, new features can be generated by the arithmetic combination of any sets of elements from the sorted array. Empirically, isolating the minimum and maximum elements and taking their sum, difference, product, and/or ratio is useful. Also, reducing the array by summing fixed numbers of adjacent elements, and taking their sums, differences, products and/or ratios has been found to generate additional useful features.

Some computed variables that result from the MOMENT and SORT subroutines need to be scaled by appropriate scaling factors to yield size and variant extracted features. Arrays clen, cdist, and rsamp contain lengths or distances, and are proportional to linear dimensions of the character. Scaling their moments and sorted elements by such linear values as perim, the minimum, maximum or average of the clen and prad arrays, or the square roots of the minimum, maximum or average of the cprd array effectively removes this linear dependence. Array cprd contains areas proportional to squared linear dimensions of the character. Scaling its moments and sorted elements by such area values as perim$^2$, the squares of the minimum, maximum or average of the clen and prad arrays, or the minimum, maximum or average of the cprd array, effectively removes this linear squared dependence. The remaining arrays cdiv, tdiff, ring and slice are already size invariant, and no further scaling of their moments and sorted elements is necessary.

In FIG. 20, the DOHOLE subroutine sets the variables hx and hy to the averages indicated by the equations in block 266, and sets hdist, the distance between the centroid hx,hy of the largest hole and the character center, thereby computing the length divided by the maximum radius length prmax 38 indicated in FIG. 2D. The variables hrat1 and hrat2 are set equal to the ratios ahole/perim and bhole/perim, respectively, as indicated in block 268.

Most of the above-described set of extracted features has been found to be more immune to "noise" produced by variations in the character structure than is the case for the above-described "structural" approach to character recognition. This improved noise immunity seems to occur because often it is difficult to ascertain whether a "noise feature" really is noise or is a true part of the character to be recognized. This problem causes great difficulty in setting various threshold levels that are required in conventional structural character recognition techniques. Noise may appear as new segments in the structural skeleton, making it necessary to greatly expand the grammars, rule bases, or decision trees that are essential to the structural approach to character recognition. Furthermore, obtaining the skeleton via the well-known medial axis transformation is much more expensive computationally than extracting the heretofore described features.

In the above-described feature extraction system, using the borders of the character to be recognized instead of its pixel mass has been useful and adequate in obtaining most of the features, except for computation of the ring and slice features, while making a tremendous reduction in the number of required computations. The resampling techniques producing fixed numbers of elements in the arrays of which Fourier transforms are computed makes it easy to utilize a few sets of precomputed trigonometric tables to obtain sines and cosines. However, the rotationally invariant ring and slice features obtained are so valuable that they, in conjunction with the other border-based features, have resulted in a highly optimized set of extracted features that can be efficiently recognized by a conventional statistical character recognition decision tree. Some of the featurues have not actually been tested, but are expected to be useful and are deemed to be within the scope of this invention.

The "robustness" and "richness" of the above-described set of extracted features plus their overall ease of computation contributes greatly to the character recognition capability of the system described in FIG. 21. A decision treat was created using the aforementioned method of Suen by clustering 3200 character samples using most of the above defined extracted features (the clustering program automatically chooses the most effective subset of features to differentiate the character classes represented) 98.3% of this training set and 97.3% of an additional untrained test set of characters were recognized correctly by this tree. Integerizing the algorithms was made easy by the bound on the dynamic range of numbers being added and multiplied together.

Appendix A attached hereto consists of a set of computer printouts of programs written in the language "C" and executable by a Motorola MC68020 microprocessor-based system corresponding to the above-described flow charts.

While the invention has been described with reference to a particular embodiment thereof, those skilled in the art will be able to make various modifications to the described embodiment of the invention without departing from the true spirit and scope thereof. It is intended that all elements and steps which perform substantially the same function in substantially the same manner to achieve the same result are within the scope of the invention. For example, some of the intermediate computer variables, such as clen, cprd, cdiv, cdist, xsamp, ysamp, rsamp, tsamp, tnorm, tdiff, ring, and slice can be utilized before orientation information and/or size information are removed. For example, such intermediate computed variables can be utilized as templates in situations wherein the characters to be recognized all known to have a given size and/or orientation. The same aforementioned intermediate computed variables can be operated upon by other transformations such as the Karhunen-Loueve, Walsh-Hadamard, Haar transformations and others to produce size and orientation invariant features. While the different sections, of this invention, including DOCON, DOPERIM, DORAD, and DOHOLE have been shown together in the described embodiment of the invention, each of them can be used exclusively of the others to provide the above-described benefits.

Although the DOCON subroutine described above utilized hypothetical minimum bounding rectangles, a similar result can be achieved by effectively rotating arbitrary hypothetical geometric shapes to compute analysis of clen, cprd, cdir, etc. Also, although the HILOSUM subroutine described above was utilized to produce convexity and concavity indicators from tdiff, HILOSUM can be applied to all of the arrays marked with + in FIG. 1, for example, to rsamp to produce long lobe (rhisum) and short lobe (rlosum) indicators.

---

APPENDIX A

```
#define MAXBORDR 1600
#define CSIZE 6
#define CCOEF 2
#define
struct {
unsigned char x;
unsigned char y;
char dir;
} border[MAXBORDR+1];
short nperim;
float cxcp[CSIZE], cycp[CSIZE];
float cx, cy;
short icx, icy;
float clen[2*CSIZE];
float cprd[CSIZE];
float cdiv[CSIZE];
```

APPENDIX A

```
float ccdst[CSIZE*(CSIZE-1)/2];
short ncc;
float ccp;
float clcoef[2*CCOEF];
float clcor[CSIZE];
float clavg, clvar, clskew, clkurt;
float clsort[CSIZE];
float cpcoef[CCOEF];
float cpcor[CSIZE];
float cpavg, covar, cpskew, cpkurt;
float cpsort[CSIZE];
float cdcoef[CCOEF];
float cdcor[CSIZE];
float cdavg, cdvar, cdskew, cdkurt;
float cdsort[CSIZE];
float ccdavg, ccdvar, ccdskew, ccdkurt;
float ccdsort[CSIZE];
void docon( )
{
extern void pdisplay( );
short i, j;
short ipcon[MAXBORDR+1];
short cdir, pdir;
register short x, y, m, n;
register float xrot, yrot;
float dxmin, dxmax, dymin, dymax;
float tsin, tcos, tx, ty;
extern struct tables *crtabs;
pdir = border[nperim - 1].dir;
for (m = n = 0; n < nperim; n++) {
cdir = border[n].dir;
while ((cdir - pdir) <= -4) cdir +=8;
while ((cdir - pdir) > 4) cdir -=8;
if (cdir > pdir) ipcon[m++] = n;
pdir = cdir;
}
mperim = m;
(PI / 2) / CSIZE radian rotation increments */
for (i = 0; i < CSIZE; i++) {
dxmin = MAXFLOAT; dxmax = -MAXFLOAT;
dymin = MAXFLOAT; dymax = -MAXFLOAT;
j = i + CSIZE;
for (m = 0; m < mperim; m++) {
x = border[ipcon[m]].x;
y = border[ipcon[m]].y;
xrot = crtabs->CCOS[x][i] - crtabs->CSIN[y][i];
yrot = crtabs->CSIN[x][i] + crtabs->CCOS[y][i];
fsamp(xproj,nperim,xsamp,FSIZE);
fsamp(yproj,nperim,ysamp,FSIZE);
pfsamp(prad,plen,perim,nperim,rsamp,FSIZE);
pfsamp(ptan,plen,perim,nperim,tsamp,FSIZE);
for (n = 1; n < FSIZE; n++)
tnorm[n] = tsamp[n] - (8. * n) / FSIZE;
for (j = 0, k = 7, psum = 0; j < 8; j++)
psum += tsamp[j];
for (j = 0; j < m; j++) {
tdiff[j] = psum / 8;
if (++k < FSIZE)
psum += tsamp[k] - tsamp[j];
else
psum +=8 + tsamp[k-FSIZE] - tsamp[j];
}
tdiff[FSIZE] = 8. + tdiff[0];
for (n = 0; n < FSIZE; n++)
tdiff[n] = tdiff[n+1] - tdiff[n];
cfourier(xsamp,ysamp,FSIZE,ccoef,dcoef,FCOEF;)
rfourier(rsamp,FSIZE,rcoef,FCOEF);
correl(rsamp,FSIZE,rcor);
moment(rsamp,FSIZE,&pravg,&prvar,&prskew,&prkurt);
sort(rsamp,FSIZE,prsort);
rfourier(tnorm,FSIZE,tcoef,FCOEF);
correl(tnorm,FSIZE,tcor);
moment(tdiff,FSIZE,&ptavg,&ptvar,&ptskew,&ptkurt);
sort(tdiff,FSIZE,ptsort);
hilosum(tdiff,FSIZE,-8./FSIZE,&tlosuma,&thisuma);
hilosum(tdiff,FSIZE,16./FSIZE,&tlosumb,&thisumb);
}
#define MAXBORDR 1600
#define FSIZE 64
#define FCOEF 8
struct {
    unsigned char x;
    unsigned char y;
    char dir;
} border[MAXBORDR+1];
short nperim;
short icx, icy;
float xproj[MAXBORDR+1];
float yproj[MAXBORDR+1];
float prad[MAXBORDR+];
float ptan[MAXBORDR+1];
float plen[MAXBORDR+1];
float prmax;
float xsamp[FSIZE+1];
float ysamp[FSIZE+1];
float rsamp[FSIZE+1];
float tsamp[FSIZE+1];
float tnorm[FSIZE+1];
float tdiff[FSIZE+1];
float ccoef[FCOEF+1];
float dcoef[FCOEF+1];
float rcoef[FCOEF+1];
float rcor[FSIZE];
float pravg, prvar, prskew, prkurt;
float prsort[FSIZE];
float tcoef[FCOEF+1];
float tcor[FSIZE];
float ptavg, ptvar, ptskew, ptkurt;
float ptsort[FSIZE];
float thisuma, tlosuma;
float thisum, tlosumb;
void doperim( )
{
register short n;
register short j, k;
short x, y, ix, iy;
short d, cd, pd, sd;
float psum;
x = border[0].x;
y = border[0].y;
prmax = 0;
sd = border[0].dir;
pd = 0;
for (n = 0; n < nperim; n++) {
xproj[n] = border[n].x;
yproj[n] = border[n].y;
plen[n] = LEN(border[n].dir);
x = border[n].x;
y = border[n].y;
ix = x - icx;
iy = y - icy;
prad[n] = dist(ix,iy);
if (rmax < prad[n]) rmax = prad[n];
d = border[n].dir;
cd = d - sd;
while ((cd - pd) <= -4) cd +=8;
while ((cd - pd) > 4) cd -=8;
pd = cd;
ptan[n] = cd;
}
dxmin = MIN(xrot, dxmin);
dxmax = MAX(xrot, dxmax);
dymin = MIN(yrot, dymin);
dymax = MAX(yrot, dymax);
}
tsin = crtabs->CSIN[1][i];
tcos = crtabs->CCOS[1][i];
tx = (dxmax + dxmin) / 2;
ty = (dymax + dymin) / 2;
cxcp[i] = tcos * tx + tsin * ty;
cycp[i] = -tsin * tx + tcos * ty;
clen[i] = dxmax - dxmin;
clen[j] = dymax - dymin;
cprd[i] = (clen[i] + 1) * (clen[j] + 1);
cdiv[i] = RAT(clen[i],clen[j]);
}
for (i = 0, ncc = 0; i < CSIZE - 1; i++)
for (j = i + 1; j < CSIZE; j++, ncc++) {
ccdst[ncc] = sqrt(SUMSQ(cxcp[i] - cxcp[j], cycp[i] - cycp[j]));
}
for (i = 0, j = 0, ccp = 0; i <= CSIZE - 2; i++, j +=
CSIZE - i)
```

APPENDIX A

```
ccp += ccdst[j];
ccp += ccdst[CSIZE -2];
FAVG(cxcp,i,CSIZE,cx);
FAVG(cycp,i,CSIZE,cy);
icx = cx; icy = cy;
rfourier(clen,CSIZE,clcoef,2*CCOEF);
correl(clen,CSIZE,clcor);
moment(clen,CSIZE,&clavg,&clvar,&clskew,&clkurt);
sort(clen,CSIZE,clsort);
rfourier(cprd,CSIZE,cpcoef,CCOEF);
correl(cprd,CSIZE,cpcor);
moment(cprd,CSIZE,&cpavg,&cpvar,&cpskew,&cpkurt);
sort(cprd,CSIZE,cpsort);
rfourier(cdiv,CSIZE,cdcoef,CCOEF);
correl(cdiv,CSIZE,cdcor);
moment(cdiv,CSIZE,&cdavg,&cdvar,&cdskew,&cdkurt);
sort(cdiv,CSIZE,cdsort);
moment(ccdiv,CSIZE*(CSIZE-1)/2,&ccdavg,&ccdvar,
  &ccdskew,&ccdkurt);
sort(ccdst,CSIZE*(CSIZE-1)/2,ccdsort);
}
void cdfourier(p, q, m, c, d, k)
register float *p, *q, *c, *d;
short m, k;
{
register float pcos, psin, qcos, qsin;
register short i, j, ij;
float csum, dsum;
extern struct tables *crtabs;
for (j = 1; j <= k; j++) {
pcos = psin = qcos= qsin = 0;
for (i = 0; i < m; i++) {
ij = (i * j) % m;
pcos += (*(p + i)) * crtabs->FCOS[ij];
psin += (*(p + i)) * crtabs->FSIN[ij];
qcos += (*(q + i)) * crtabs->FCOS[ij];
qsin += (*(q + i)) * crtabs->FSIN[ij];
}
*(c + j) = SUMSQ(pcos + qsin, -psin + qcos);
*(d + j) = SUMSQ(pcos, psin) + SUMSQ(qcos, qsin);
}
csum = dsum = 0;
for (j = 1; j <= k; j++) {
csum += *(c + j);
dsum += *(d + j);
for (j = 1; j <= k; j++) {
*(c + j) = sqrt(*(c + j) / csum);
*(d + j) = sqrt(*(d + j) / dsum);
}
}
void pfsamp(f, dt, st, n, p, m)
register float *f, *dt, *p;
float st;
short m, n;
{
float dtsum, favg, fsum, size;
register short i, j;
size = st / m;
j = 0 ; fsum = 0; dtsum = 0;
for (i = 0; i < n; i++)
{
dtsum = dtsum + *(dt+i);
favg = *(f+i);
fsum = fsum + favg * *(dt+i);
while (dtsum >= size)
{
*(p+j) = fsum;
dtsum = dtsum - size;
fsum = favg * dtsum;
*(p+j) = (*(p+j) - fsum) / size;
j = j+1;
}
}
}
void fsamp(f, n, p, m)
register float *f, *p;
short m, n;
{
float dtsum, favg, fsum, size;
register short i, j;
size = (float)n / m;
j = 0 ; fsum = 0; dtsum = 0;
for (i = 0; i < n; i++)
{
dtsum = dtsum + 1;
favg = *(f+i);
fsum = fsum + favg;
while (dtsum >= size)
{
*(p+j) = fsum;
dtsum = dtsum - size;
fsum = favg * dtsum;
*(p+j) = (*(p+j) - fsum) / size;
j = j+1;
}
}
}
void hilosum(p, m, ptol, lnsum, hnsum)
register float *p;
float ptol, *lnsum, *hnsum;
short m;
{
register short i;
register short lnum, hnum;
register float pval;
lnum = hnum = *lnsum = *hnsum = 0;
for (i = 0; i < m; i++) {
pval = *(p+i);
if (pval < ptol) {
lnum++;
*lnsum += pval;
}
else {
hnum++;
*hnsum += pval;
}
}
if (lnum > 0) *lnsum = (lnum * ptol - *lnsum) / m;
if (hnum > 0) *hnsum = (*hnsum - hnum * ptol) / m;
}
#define MAXWX 200
#define MAXWY 200
#define RSIZE 8
#define SSIZE 24
#define SCOEF 6
char p[MAXWX+1][MAXWY+1];
short wx, wy;
short npix;
short icx, icy;
float ring[RSIZE];
float slice[SSIZE];
float rravg, rrvar, rrskew, rrkurt;
float rrsort[RSIZE];
float scoef[SCOEF];
float scor[SSIZE];
float savg, svar, sskew, skurt;
float ssort[SSIZE];
void dorad( )
{
register short x, y, r, s;
short ix, iy;
float rsize, ssize;
rsize = 7.9999999 / prmax;
ssize = 23.999999 / (2 * PI);
for (r = 0; r < RSIZE; r++) ring[r] = 0;
for (s = 0; s < SSIZE; s++) slice[s] = 0;
for (y = 0; y <= wy; y++)
for (x = 0; x <= wx; x++)
if (p[x][y] > 0) {
ix = x - icx; iy = y - icy;
r = dist(ix,iy) * rsize;
s = ang(ix,-iy,-PI/24.) * ssize;
++ring[r];
++slice[s];
}
for (r = 0; r < RSIZE; r++) ring[r] /= (float)npix;
for (s = 0; s < SSIZE; s++) slice[s] /= (float)npix;
moment(ring,RSIZE,&rravg,&rrvar,&rrskew,&rrkurt);
sort(ring,RSIZE,rrsort);
rfourier(slice,SSIZE,scoef,SCOEF);
correl(slice,SSIZE,scor);
moment(slice,SSIZE,&savg,&svar,&sskew,&skurt);
sort(slice,SSIZE,ssort);
```

APPENDIX A

```
}
#define MAXBORDR 1600
#define MAXHOLES 8
#define MINHRAT .05
struct {
unsigned char x;
unsigned char y;
char dir;
} border[MAXBORDR+1];
short ibord[MAXHOLES+2];
float lbord[MAXHOLES+1];
short nperim;
short nbord;
float perim;
float cx, cy;
float hdist;
float hrat1;
float hrat2;
void dohole()
{
short k, l, n;
short sx, sy;
float fk;
float hx, hy;
float lmax, lnext;
hdist = 0;
if (nbord >= 2) {
for (k = 1, fk = 0; k < nbord; k++)
if (fk < lbord[k]) {
fk = lbord[k];
l = k;
}
}
sx = sy = 0;
for (n = ibord[l]; n < ibord[l + 1]; n++)
sx += border[n].x;
sy += border[n].y;
}
n = ibord[l + 1] - ibord[l];
hx = (float)sx / n;
hy = (float)sy / n;
hdist = 2 *sqrt(SUMSQ(cx - hx, cy - hy)) / prmax;
}
hrat1 = hrat2 = 0.;
if (nbord == 2)
hrat1 = lbord[1] / perim;
}
else if (nbord > 2)
maxmax(&lbord[1], nbord - 1, &lmax, &lnext);
hrat1 = lmax / perim;
hrat2 = lnext / perim;
}
if (hrat1 < minhrat) hrat1 = 0.;
if (hrat2 < minhrat) hrat2 = 0.;
}
void rfourier(p, m, c, k)
register float *p, *c;
short m, k;
{
register float sa, sb;
register short i, j, ij;
float csum;
extern struct tables *crtabs;
for (j = 1; j <= k; j++) {
sa = 0; sb = 0;
for (i = 0; i < m; i++) {
ij = (i * j) % m;
sa += (*(p + i)) * crtabs->FCOS[ij];
sb += (*(p + i)) * crtabs->FSIN[ij];
}
*(c + j) = SUMSQ(sa, sb);
}
csum = 0;
for (j = 1; j <=k; j++) csum += *(c + j);
for (j = 1; j <= k; j++) {
*(c + j) = sqrt(*(c + j) / csum);
}
}
void correl(p, m, c)
register float *p, *c;
short m;
```

APPENDIX A

```
{
register short i, j;
for (i = 0; i < m; i++) {
*(c+i) = 0;
for (j = 0; j < m; j++)
*(c+i) += *(p + j) * *(p + (j + i) % m);
}
if (i > 0) *(c+i) /= *c
}
void moment(p, m, avg, var, skew, kurt)
register float *p;
float *avg, *var, *skew, *kurt;
short m;
{
float mu1, mu2, mu3, mu4;
register float prod, pval;
register short j;
mu1 = mu2 = mu3 = mu4 = 0;
for (j = 0; j < m; j++) mu1 += *(p + j);
mu1 /= m;
for (j = 0; j < m; j++) {
pval = *(p + j) - mu1;
prod = pval * pval;
mu2 += prod;
prod = prod * pval;
mu3 += prod;
mu4 += prod * pval;
}
mu2 /= m;
mu3 /= m;
mu4 /= m;
*avg = mu1;
*var = sqrt(ABS(mu2));
*skew = cbrt(ABS(mu3));
*kurt = sqrt(sqrt(ABS(mu4)));
}
```

I claim:

1. A method of operating a computer to extract size-invariant, orientation-invariant features of an electronically scanned character, the method comprising the steps of:

(a) providing a plurality of x and y coordinates of a plurality of perimeter pixels of the scanned character;

(b) operating on the x and y coordinates to determine values of a preselected parameter of a plurality of minimum bounding polygons each oriented differently relative to the character, each minimum bounding polygon having a plurality of sides each of which touches at least one respective perimeter point of the character, respectively; and (c) operating on the values of eliminate size and orientation information therefrom, to thereby produce the extracted features.

2. The method of claim 1 wherein each minimum bounding polygon is a minimum bounding rectangle and step (c) includes determining the dimensions of two mutually perpendicular sides of each minimum bounding rectangle.

3. The method of claim 2 wherein step (b) includes computing the area and an aspect ratio of each minimum bounding rectangle.

4. The method of claim 2 wherein step (b) includes determining the coordinates of the center points of each of the minimum bounding rectangles, and computing distances between those center points.

5. The method of claim 4 wherein step (b) includes determining the sum of the computed distances between adjacent center points.

6. The method of claim 1 wherein step (c) includes computing a one-dimensional moment of the values.

7. The method of claim 1 wherein step (c) includes sorting various ones of the values of the preselected parameter.

8. The method of claim 7 wherein step (c) includes performing a preselected arithmetic combination of preselected sorted values.

9. The method of claim 1 wherein step (c) includes performing a real Fourier transform on the values of the preselected parameter.

10. The method of claim 1 wherein step (c) includes performing an autocorrelation on the values of the parameter.

11. The method of claim 2 including effectively rotating each of the minimum bounding rectangles except a first one through a 15 degree angle relative to a prior one, wherein there are 6 of the minimum bounding rectangles.

12. The method of claim 1 wherein step (c) includes effectively rotating the character relative to an x,y coordinate system to produce the different relative orientations.

13. A system for extracting size-invariant, orientation-invariant features of a character, the system comprising in combination:
 (a) means for scanning the character and means responsive to the scanning means for producing a plurality of x and y coordinates of a plurality of perimeter pixels of the scanned character;
 (b) means for operating on the x and y coordinates to determine values of a preselected parameter of a plurality of minimum bounding polygons each oriented differently relative to the character, each minimum bounding polygon having a plurality of sides each of which touches at least one respective perimeter point of the character, respectively; and
 (c) means for operating on the values to eliminate size and orientation information therefrom.

14. The system of claim 13 wherein each minimum bounding polygon is a minimum bounding rectangle and including means for determining the dimensions of two mutually perpendicular sides of each minimum bounding rectangle.

15. The system of claim 14 including means for computing the area and an aspect ratio of each minimum bounding rectangle.

16. The system of claim 14 including means for determining the coordinates of the center points of each of the minimum bounding rectangles, and computing distances between those center points.

17. The system of claim 16 including means for determining the sum of the computed distance between adjacent center points.

18. The system of claim 13 including means for computing a one-dimensional moment of the values.

19. The system of claim 13 including means for sorting various ones of the values of the preselected parameter.

20. The system of claim 18 including means for performing a a plurality of preselected arithmetic combination of preselected sorted values.

21. The system of claim 13 including means for effectively rotating the character relative to an x,y coordinate system to produce the different relative orientations.

* * * * *